(12) United States Patent     (10) Patent No.: US 12,614,098 B2

Blatt et al.     (45) Date of Patent: Apr. 28, 2026

(54) HARDWARE-EFFICIENT NEUTRAL ATOM QUANTUM COMPUTING METHOD AND DEVICE

(71) Applicants: Max-Planck-Gesellschaft zur Foerderung der Wissenschaften e.V., Munich (DE); Ludwig-Maximilians-Universitaet Muenchen, Munich (DE)

(72) Inventors: Sebastian Blatt, Garching (DE); Immanuel Bloch, Garching (DE); Andrea Alberti, Garching (DE); Johannes Zeiher, Garching (DE); Lorenzo Festa, Garching (DE); Max Robert Melchner Von Dydiowa, Garching (DE); Robin Eberhard, Garching (DE); Zhao Zhang, Garching (DE); Kevin Mours, Garching (DE); Dimitrios Tsevas, Garching (DE)

(73) Assignees: MAX-PLANCK-GESELLSCHAFT ZUR FOERDERUNG DER WISSENSCHAFTEN E.V., Munich (DE); LUDWIG-MAXIMILIANS-UNIVERSITAET MUENCHEN, Munich (DE)

( * ) Notice: Subject to any disclaimer, the term of this patent is extended or adjusted under 35 U.S.C. 154(b) by 0 days.

(21) Appl. No.: 18/755,715

(22) Filed: Jun. 27, 2024

(65) Prior Publication Data

US 2025/0005420 A1     Jan. 2, 2025

(30) Foreign Application Priority Data

Jun. 27, 2023    (EP) .................................... 23181879

(51) Int. Cl.
| | | |
|---|---|---|
| *G06N 10/40* | (2022.01) | |
| *G06N 10/20* | (2022.01) | |
| *G06N 10/80* | (2022.01) | |

(52) U.S. Cl.
CPC ............. G06N 10/40 (2022.01); G06N 10/20 (2022.01); G06N 10/80 (2022.01)

(58) Field of Classification Search
CPC ......... G06N 10/40; G06N 10/80; G06N 10/20

(Continued)

(56) References Cited

FOREIGN PATENT DOCUMENTS

WO     WO-2024081046 A2 *   4/2024  ............. G06N 10/40

OTHER PUBLICATIONS

H. Levine et al, "Parallel implementation of High Fidelity Multi-Qubit Gates with Neutral Atoms" Physical Review Letters Aug. 20, 2019). (Year: 2019).*

(Continued)

*Primary Examiner* — Arnold M Kinkead

(74) *Attorney, Agent, or Firm* — LEYDIG, VOIT & MAYER, LTD.

(57) ABSTRACT

A method for quantum computing using neutral atoms in an array of optical traps, wherein a first internal state serves as qubit ground state |o>, and a second internal state serves as qubit excited state |1>, includes performing a local single-qubit gate operation comprising: locally and selectively illuminating a qubit prepared in a superposition state |s> of qubit ground state |0> and qubit excited state |1> with a qubit addressing laser at a first qubit addressing laser frequency to cause a differential Stark shift for the qubit ground state |0> and the qubit excited state |1>. The method also includes performing a local two-qubit gate operation comprising: locally and selectively illuminating a pair of qubits prepared in the qubit ground state |0> with the qubit (Continued)

addressing laser at a second qubit addressing laser frequency for coupling the pair of qubits to a Rydberg state |r>.

20 Claims, 11 Drawing Sheets

(58) Field of Classification Search
USPC ........................... 326/3; 372/29.01; 331/94.1
See application file for complete search history.

(56) References Cited

OTHER PUBLICATIONS

Baumgaertner, Alexander et al.; "A new apparatus for trapping and manipulating single Strontium atoms"; *Master Thesis in Physics—California Institute of Technology*, Jan. 1, 2017; pp. 1-90; XP055705136; University of Heidelberg; Heidelberg, Germany.

Levine, Harry et al.; "Parallel Implementation of High-Fidelity Multi-Qubit Gates With Neutral Atoms"; *Physical Review Letters*; Aug. 20, 2019; pp. 1-19; vol. 123, No. 170503; XP093108073; ArXiv.org, Cornell University; Ithaca, NY, USA.

Lis, Joanna W. et al.; "Mid-circuit operations using the omg-architecture in neutral atom arrays"; *Physical Review X*; Jun. 21, 2023; pp. 1-22; vol. 13, No. 041035; XP091543938; ArXiv.org, Cornell University; Ithaca, NY, USA.

Morgado Manuel et al.; "Quantum simulation and computing with Rydberg qubits"; *AVS Quantum Science*; Nov. 6, 2020; pp. 1-35; vol. 3; XP081797032; ArXiv.org, Cornell University; Ithaca, NY, USA.

Scholl, Pascal et al.; "Erasure conversion in a high-fidelity Rydberg quantum simulator"; *Nature*; May 5, 2023; pp. 1-17; vol. 622; XP091502336; ArXiv.org, Cornell University; Ithaca, NY, USA.

Stack Exchange Inc.; "How does |00) evolve through an Hadamard and a CNOT gate?"; *Quantum Computing Stack Exchange*; May 10, 2021; pp. 1-2; XP093138798; [Online] Retrieved from internet: https://quantumcomputing.stackexchange.com/questions/17425/how-does-00-rangle-evolve-through-an-hadamard-and-a-cnot-gate; Stack Exchange Inc.; New York, NY, USA.

* cited by examiner

100

140

190

170

120

150

110

130

166

180

160

164

162

195

1000

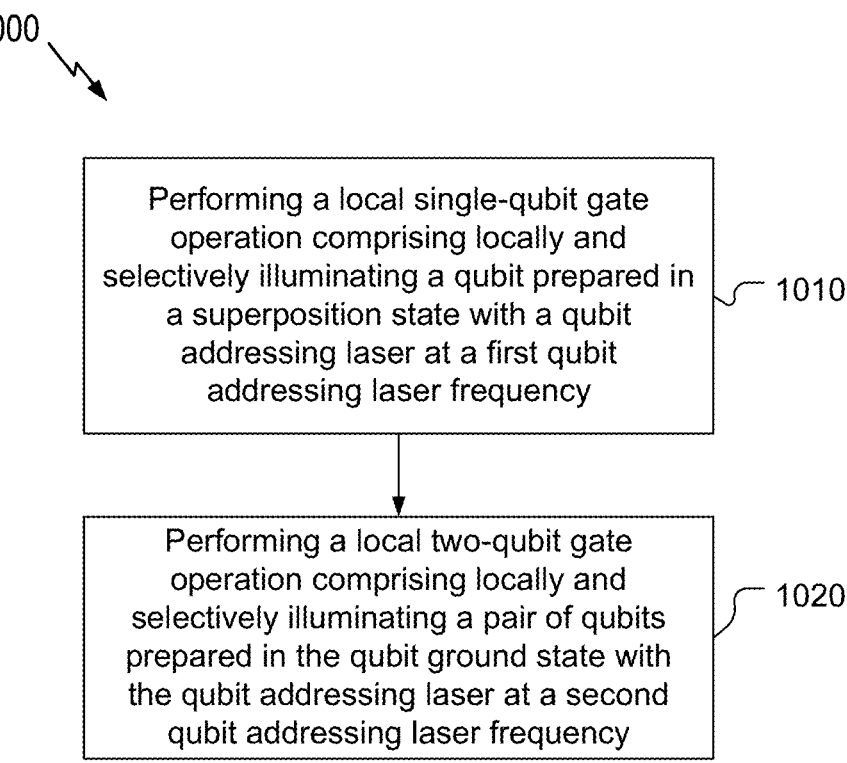

Performing a local single-qubit gate operation comprising locally and selectively illuminating a qubit prepared in a superposition state with a qubit addressing laser at a first qubit addressing laser frequency — 1010

Performing a local two-qubit gate operation comprising locally and selectively illuminating a pair of qubits prepared in the qubit ground state with the qubit addressing laser at a second qubit addressing laser frequency — 1020

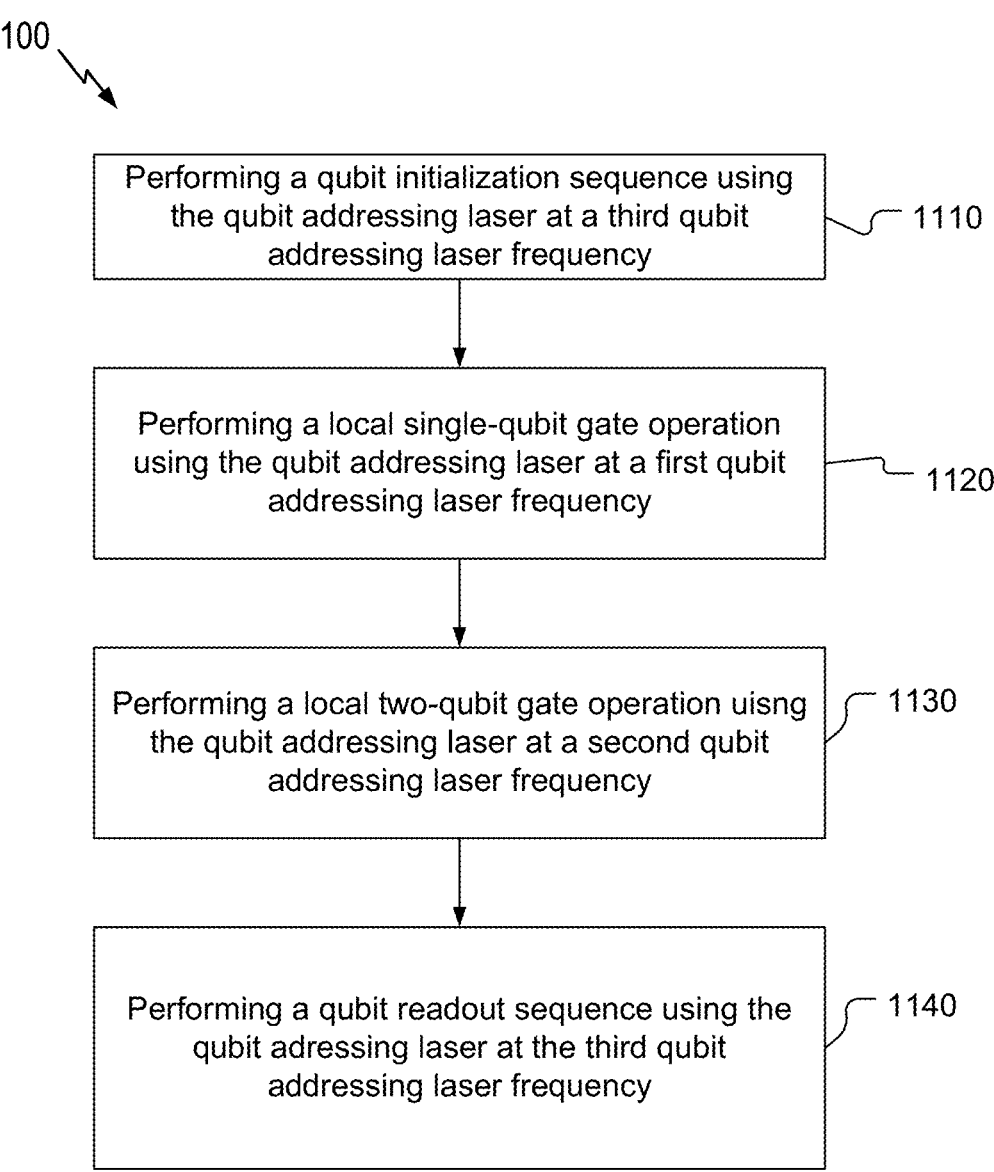

Performing a qubit initialization sequence using the qubit addressing laser at a third qubit addressing laser frequency — 1110

Performing a local single-qubit gate operation using the qubit addressing laser at a first qubit addressing laser frequency — 1120

Performing a local two-qubit gate operation uisng the qubit addressing laser at a second qubit addressing laser frequency — 1130

Performing a qubit readout sequence using the qubit adressing laser at the third qubit addressing laser frequency — 1140

FIG. 11

HARDWARE-EFFICIENT NEUTRAL ATOM QUANTUM COMPUTING METHOD AND DEVICE

CROSS REFERENCE TO RELATED APPLICATION

This application claims benefit to European Patent Application No. EP 23181879.0, filed on Jun. 27, 2023, which is hereby incorporated by reference herein.

FIELD

Aspects of the present disclosure relate to quantum computing using neutral atoms, e.g. in optical traps, as qubits, and more particularly to techniques, systems and devices for hardware-efficient quantum computing with neutral atoms, e.g., in an optical trap array.

BACKGROUND

Quantum computers have been proposed for many years as a platform for computation that can outperform classical devices in specific applications. Quantum computers use physical qubits to store the basic unit of information and perform quantum gates on the qubits to process the stored information, e.g. according to processing instructions of a quantum computing algorithm. Running quantum algorithms requires single- and two-qubit gates, which are the basic computation operations acting on individual qubits and individual pairs of qubits, respectively.

Selectively addressing individual qubits and individual pairs of qubits usually comes with a significant technical overhead, which complicates scalability of quantum computing devices. Neutral atom-based quantum computers typically trap neutral atoms (i.e. electrically neutral atoms) in optical potentials (e.g. in arrays of optical dipole traps or in optical lattices), and two long-lived (with respect to operation time) internal (electronic), or external, (motional) states form the states of the qubits.

In such systems, single-qubit gates can be implemented via, e.g., optical or microwave, transitions between two stable or metastable internal states of the neutral atoms, e.g. between two hyperfine states of the electronic ground state coupled by a microwave transition (e.g., ~6.834 GHz for 87Rb). Two- and multi-qubit gates, such as the controlled phase gate can be realized, e.g., using optical transitions to highly excited Rydberg states (for a comprehensive overview see M. Morgado and S. Whitlock, Quantum simulation and computing with Rydberg-interacting qubits; AVS Quantum Sci. 3, 023501 (2021)) that allow for qubit-qubit interaction and entanglement in the optical trap array.

SUMMARY

An aspect of the present disclosure provides a method for quantum computing using a plurality of neutral atoms in an array of optical traps, wherein a first internal state of the neutral atoms serves as qubit ground state $|0>$, and a second internal state serves as qubit excited state $|1>$. The method includes performing a local single-qubit gate operation on a qubit comprising: locally and selectively illuminating the qubit prepared in a superposition state $|s>$ of qubit ground state $|0>$ and qubit excited state $|1>$ with a qubit addressing laser at a first qubit addressing laser frequency to cause a differential Stark shift for the qubit ground state $|0>$ and the qubit excited state $|1>$. The method also includes performing a local two-qubit gate operation on a pair of qubits comprising: locally and selectively illuminating the pair of qubits prepared in the qubit ground state $|0>$ with the qubit addressing laser at a second qubit addressing laser frequency for coupling the pair of qubits to a Rydberg state $|r>$ of the neutral atoms, preferably via a third internal state $|c>$ of the neutral atoms that serves as an intermediate state of a two-photon transition from the qubit ground state $|0>$ to the Rydberg state $|r>$.

BRIEF DESCRIPTION OF THE DRAWINGS

So that features of various aspects of the present disclosure can be understood in detail, a more particular description may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements. Thus, the aspects and figures described below should be understood to be examples. All features described and/or illustrated herein can be used alone or combined in different combinations. The features and advantages of various aspects, implementations or embodiments will become apparent by reading the following detailed description with reference to the attached drawings, which illustrate the following:

FIG. 10 shows a process diagram of a quantum computing method according to a possible implementation of the present disclosure.

FIG. 11 shows a process diagram of a quantum computing method according to a possible implementation of the present disclosure.

DETAILED DESCRIPTION

Figure 1:
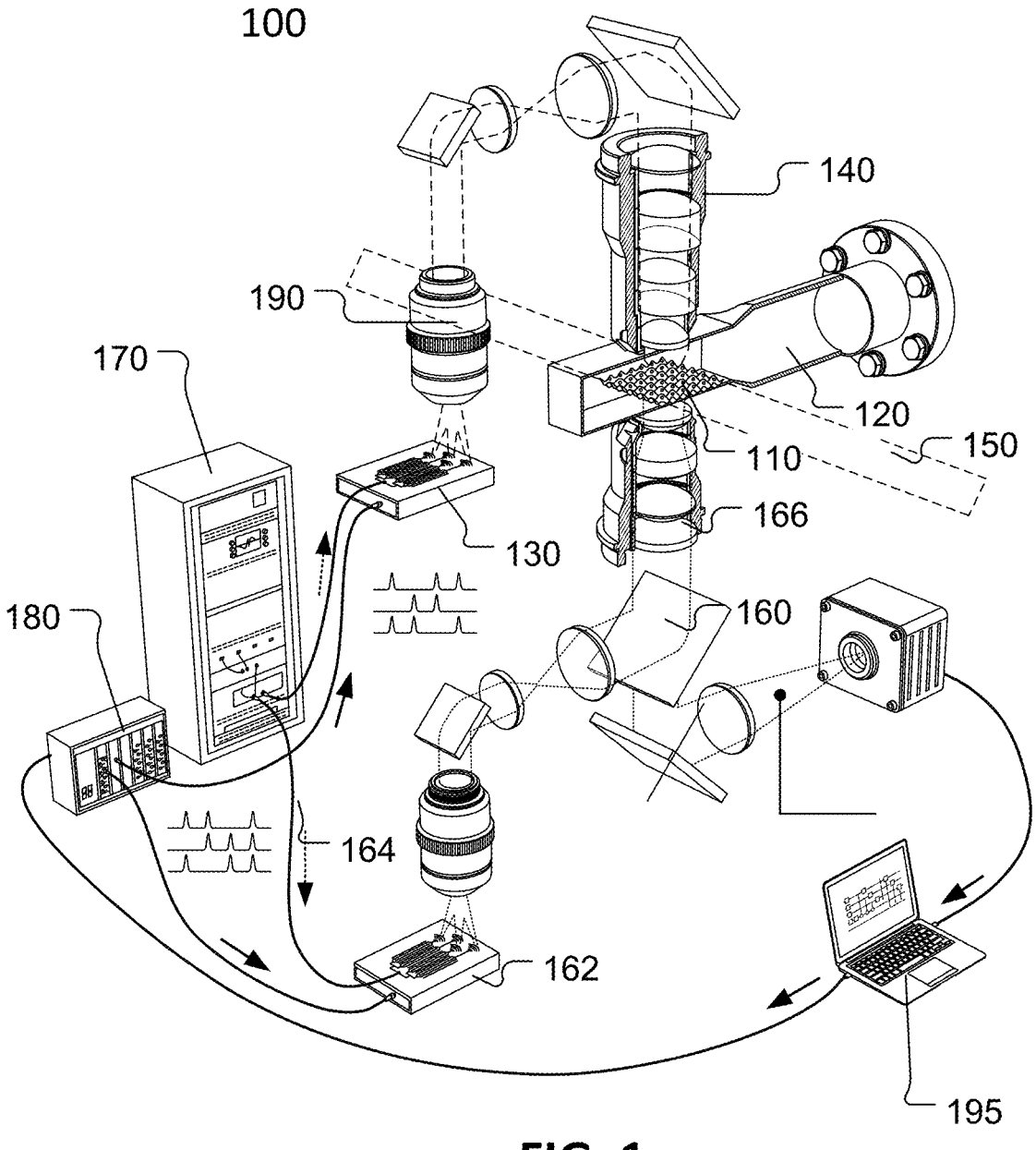
FIG. 1 illustrates a neutral atom quantum computing device according to a possible implementation of the present disclosure.

The present disclosure relates to a device and a method for quantum computing using a plurality of neutral atoms in an array of optical traps, wherein a first internal state of the neutral atoms serves as qubit ground state |o>, and a second internal state serves as qubit excited state |1>. According to the present disclosure, a local single-qubit gate operation on a qubit may be performed comprising locally and selectively illuminating the qubit prepared in a superposition state |s> of qubit ground state |0> and qubit excited state |1> with a qubit addressing laser at a first qubit addressing laser frequency to cause a differential Stark shift for the qubit ground state |0> and the qubit excited state |1>, Further, a local two-qubit gate operation may be performed on a pair of qubits comprising locally and selectively illuminating the pair of qubits prepared in the qubit ground state |0> with the qubit addressing laser at a second qubit addressing laser frequency for coupling the pair of qubits to a Rydberg state |r> of the neutral atoms preferably via a third internal state c> of the neural atoms that can serve as an intermediate state of a two-photon transition from the qubit ground state |0> to the Rydberg state |r>.

One of the main challenges in neutral atom-based quantum computing devices is the execution of qubit gate operations on individual atoms with high fidelity. Typical single and two-qubit gate schemes require the use of laser light with local spatial control, as well as relative phase control between the atomic quantum state, and the laser field at the positions of the neutral atoms used for the respective quantum gate operation. Known schemes for quantum computing with neutral atoms use at least two different laser systems, each equipped with an independent individual-atom addressing unit for operating local single and two-qubit gates.

Such addressing units for individual atoms in an optical trap array typically comprise dedicated hardware for spatially controlling an addressing laser pattern (e.g., a combination of acousto-optic modulators (AOMs), acousto-optic deflectors (AODs), spatial light modulators (SLMs) and digital micromirror devices (DMDs)), as well as further hardware to rapidly turn on and off the laser beams to minimize error sources such as heating, qubit loss, etc. Each laser control element typically also causes power losses which become crucial for wavelengths where laser power is limited by current technology, such as for lasers operating in the UV or XUV range of the electromagnetic spectrum. These losses become especially problematic for two-qubit gates which use optical transitions to Rydberg states that require UV lasers, for which precise temporal switching and efficient local spatial control may be difficult, complex, and/or not reliable, thereby limiting scalability and gate fidelity.

To address such and similar shortcomings of state-of-the-art technology the present disclosure provides quantum computing methods, devices and systems using neutral atoms trapped in optical potentials that are optimized for hardware-efficiency.

The present disclosure provides a method for quantum computing using a plurality of neutral atoms in an array of optical traps, wherein a first internal state of the neutral atoms serves as qubit ground state (|0>), and a second internal state serves as qubit excited state (|1>). The method involves performing a local single-qubit gate operation on a qubit comprising locally and selectively illuminating the qubit prepared in a superposition state |s> of qubit ground state |0> and qubit excited state |1> with a qubit addressing laser at a first qubit addressing laser frequency, to cause a differential Stark shift for the qubit ground state |0> and the qubit excited state |1>. The method further involves performing a local two-qubit gate operation on a pair of qubits comprising locally and selectively illuminating the pair of qubits, prepared in the qubit ground state |0> with the qubit addressing laser at a second qubit addressing laser frequency, for coupling the pair of qubits to a Rydberg state |r> of the neutral atoms, preferably via a third internal state |c> of the neural atoms that serves as an intermediate state of a two-photon transition from the qubit ground state |0> to the Rydberg state |r>. In some examples, the local single-qubit gate operation may be performed on a plurality of qubits which form a true subset of the set of qubits that may be available in the array of optical traps, wherein the plurality of qubits may be locally and selectively illuminated. Similarly, the local two-qubit gate operation may be performed on a plurality of pairs of qubits which form a true subset of the set of qubits that may be available in the array of optical traps, wherein the plurality of pairs of qubits may be locally and selectively illuminated.

For example, the first internal state may be an electronic ground state of the neutral atoms (e.g. a spin-singlet state 1S0 of an alkaline earth atom in the electronic ground state). The second internal state may be a metastable, long-lived excited state of the neutral atoms. (e.g. a spin-triplet state 3P0 of an alkaline earth atom). For instance, the qubit ground state may be an S=0, L=0, J=o state of the electronic ground state, the qubit excited state may be an S=1, L=1, J=0 state of an electronic excited state and the third internal state may be an S=1, L=1, J=1 state of the electronic excited state, where S is the total spin quantum number, L the orbital angular momentum quantum number and J the total angular momentum quantum number. Typically, a metastable, long-lived excited state of neutral atoms is an excited state that has an essentially vanishing dipole matrix element with the electronic ground state. The resulting long lifetime of such states leads to a very narrow linewidth that can serve as a so-called clock transition used in optical atomic clocks, e.g. in strontium optical lattice clocks.

Thus, the quantum computation scheme as disclosed herein is hardware-efficient in the sense that the same addressing laser system can be used for realizing single-qubit gates and two-qubit gates. As mentioned above, two-qubit gates may be implemented using an excited state |c> of the neutral atom as intermediate state for a two-photon coupling between qubit ground state |0> and a highly-excited long-lived Rydberg state |r>. For example, in some implementations (see FIG. 6 below), |c> may be used as a shelving state, from where the neutral atoms can further be excited to a highly-excited, long-lived Rydberg state |r>. Such a shelving process can be quickly executed, and with high reliability, since e.g. frequency shifts added to the laser light have negligible influence on the two-qubit gate. In other implementations, |c> may serve as a so-called virtual state, e.g., when the qubit ground state |o> is coupled to the Rydberg state |r> via a two-photon transition that is single-photon detuned with respect to the intermediate state |c>. Furthermore, and importantly, the second photon used for coupling to the Rydberg state |r> during a two-qubit gate can be derived from a global laser source, circumventing fast local switching of UV sources, which may be technically challenging, expensive and/or unreliable. In some implementations, to realize two-qubit gates, two independent addressing beams may be used to nullify the differential frequency shifts between atoms incurred by local addressing hardware (e.g., by an AOD) of the qubit addressing laser system However, typically, the Rabi frequency of the qubit addressing laser on or near resonance to the |0> to |c> transition is much larger than the differential frequency shifts (e.g. ~1 MHZ) for two neighboring qubits. As a result, the effect of such a differential frequency shift does not substantially affect gate fidelity.

Further, the qubit addressing laser may also be used for performing sideband cooling of the neutral atoms during a qubit initialization sequence and/or during a qubit readout sequence, e.g. via globally illuminating the array of optical traps with the qubit addressing laser at a third qubit addressing laser frequency (e.g. equal to the transition frequency of the $|0>$ to $|c>$ transition minus the trap frequency $\omega$ o the optical trap array), or via locally and selectively illuminating one or more qubits with the qubit addressing laser at the third qubit addressing laser frequency. For example, during qubit initialization or during qubit readout of the qubit array global sideband cooling can be used to transfer all qubits to the motional ground state and/or to counteract heating and loss induced by an imaging laser during qubit readout. The fluorescence emitted from the atoms via either global or local illumination can also be collected directly for detection of the qubit states.

Thus, according to aspects of the present disclosure, a single laser system, e.g. comprising a single laser medium and/or a single output, i.e., the qubit addressing laser system, can also be used for further procedures essential for neutral atom-based quantum computing. Importantly, the high degree of spatial and temporal control of the qubit addressing laser required for realizing high-fidelity local quantum gates can thus also be used for improving qubit array initialization and qubit readout, e.g. for selective defect repair due to atom loss, calibration and/or quantum error correction schemes, where selective and local lossless readout and/or selective and local qubit cooling may be instrumental. Thus, the present disclosure also facilitates the use of advanced quantum computing schemes without a substantial increase in hardware complexity.

In some implementations, performing the local single-qubit gate operation using the qubit addressing laser may further comprise globally illuminating the array of optical traps with a first qubit state transition laser pulse (e.g. a $\pi/2$-pulse) to coherently transfer qubits prepared in the qubit ground state $|0>$ to a superposition state $|s>$ of qubit ground state $|0>$ and qubit excited state $|1>$, and globally illuminating the array of optical traps with a second qubit state transition laser pulse (e.g. a $\pi/2$-pulse) to coherently transfer qubits prepared in the superposition state $|s>$ to the qubit ground state $|0>$, i.e. qubits that were not illuminated by the qubit addressing laser pulse. For example, the required 180° phase shift of the global qubit state transition laser may be induced by an EOM. In other implementations, the qubit addressing laser may be used to induce such a phase shift for atoms that should not participate in the single-qubit gate operation, that is, arrive back in the initial state after the full pulse sequence.

Further, in some implementations of the present disclosure, performing the local two-qubit gate operation using the qubit addressing laser may comprise globally illuminating the array of optical traps with a Rydberg laser pulse (e.g. a $\pi$-pulse) to coherently transfer the one or more pairs of qubits from the third internal state $|c>$ to a Rydberg state $|r>$ of the neutral atoms, or to a superposition state of the Rydberg state and the third internal state. In some implementations, performing the local two-qubit gate operation using the qubit addressing laser may comprise locally and selectively illuminating the one or more pairs of qubits with the qubit addressing laser at a fourth qubit addressing laser frequency or the first qubit addressing laser frequency to cause a differential AC Stark shift for the third internal state and the Rydberg state. In this manner, even advanced two-qubit gates such as a so-called Levine-Pichler gate (cf. H. Levine et al.: Parallel Implementation of High-Fidelity Multiqubit Gates with Neutral Atoms; Phys. Rev. Lett. 123, 170503) or a so-called time optimal gate (cf. S. Jandura and G. Pupillo: Time-Optimal Two- and Three-Qubit Gates for Rydberg Atoms; Quantum 6, 712 (2022).) can be realized without requiring a significant increase in hardware complexity.

As disclosed herein, qubits used for quantum computing may thus be implemented using a ground state and a metastable excited state of a neutral atom, e.g. of an alkaline-earth-like atom such as Dy, Er, Sr, Yb etc. In such and similar quantum computing systems, the qubit states $|0>$ and $|1>$ can be coupled via a single laser beam resonant on an ultranarrow atomic transition in a single-photon excitation scheme. In such and similar systems, arbitrary SU(2) rotations in Hilbert space spanned by $|0>$ and $|1>$ can be realized in a single-qubit gate e.g. via two global $\pi/2$-laser pulses, with a phase difference of 180°, provided by the global qubit state transition laser, combined with one or more selective and local Stark-shifting pulses with controllable effective duration or pulse area, provided by the qubit addressing laser system before, between, and after the global rotations generated by a qubit state transition laser globally illuminating the optical trap array. In this manner, the qubit state transition laser, which typically requires a narrow laser linewidth and ultralow phase noise, does not require local position control and arbitrary pulse width or pulse shape control to realize arbitrary single-qubit gates. As typical hardware used for such laser parameter control degrades laser phase noise and power, as well as frequency and/or amplitude stability, the present disclosure substantially improves single-qubit gate fidelity in such systems, because the qubit state transition laser can be operated as cleanly and thus as robustly as possible without negative impact on spatial control and gate speed.

For example, in some implementations, the neutral atoms may comprise the bosonic strontium isotope 88Sr. For such physical qubits, the qubit addressing laser may operate at a design wavelength of 689.4 nm, the Rydberg laser at a design wavelength of 318.5 nm, and the qubit state transition laser at a wavelength of 698.4 nm. As discussed above, both the Rydberg laser and the qubit state transition laser neither require local position control, arbitrary pulse width/pulse shape control, nor adjustable laser frequency control. Thus, the present disclosure allows for a substantial reduction of hardware requirements for both laser systems that, by design, need to operate as robustly and reliably as possible.

As disclosed herein, hardware complexity needed for position, pulse width/shape, and frequency control is thus shifted to the qubit addressing laser system for which the effects of fluctuations on gate fidelity, loss, etc., caused by the additional hardware (e.g. amplitude or laser frequency fluctuations caused by AOMs, AODs, etc.), are much less severe than for the ultra-narrow qubit state transition laser or the UV Rydberg laser. For example, the qubit addressing laser system can operate in the visible or near-infrared part of the electromagnetic spectrum, where robust and reliable laser sources and fast laser control devices are readily available, including integrated optical devices. By contrast, in the UV spectral range, both local addressing optics as well as spatial light modulation devices are challenging to realize. Further, the third internal state $|c>$ used for single-qubit gates (via AC shark shift) and for two-qubit gates (as initial state $|c>$ for the Rydberg transition) typically has a substantially shorter lifetime than the qubit excited state $|1>$. Thus, the associated linewidth is also substantially larger than the linewidth of the qubit state transition from |0> to |1>. Therefore, amplitude and/or laser frequency fluctuations of the qubit addressing laser have a much smaller effect on gate fidelity compared to similar fluctuations on the qubit state transition laser.

To further reduce hardware complexity for neutral-atom-based quantum computing, the qubit addressing laser system may also be used for sideband cooling of the neutral atoms in the optical trap array, e.g. during qubit readout and/or for high-fidelity state preparation after initial trap loading and/or after qubit readout. Usually, pre-cooled neutral atoms (e.g. using laser cooling) are loaded into the optical trap array such that each atom is in an excited motional state of the optical trap array. For reliable quantum computing, however, all qubits should be cooled into or close to the motional ground state of the optical trap array. According to the present disclosure, the qubit addressing laser system may be operated at a third laser frequency that facilitates sideband cooling for each trapped atom. Thus, globally illuminating the optical trap array with the qubit addressing laser system, e.g. via an additional global illumination path that may be superimposed with the qubit state transition laser, can be used for initializing the qubit array in or close to the motional ground state of the trap array, using the same laser system that is needed for performing arbitrary local quantum gates.

Thus, in some implementations, the method disclosed herein may further comprise one or more of: shifting the laser frequency of the qubit addressing laser to the first qubit addressing laser frequency used for controlling qubit phase during single-qubit gates, shifting the laser frequency of the qubit addressing laser to the second qubit addressing laser frequency used for coherently transferring qubits to the initial state of the Rydberg transition, and shifting the laser frequency of the qubit addressing laser to the third qubit addressing laser frequency used for sideband cooling (e.g. resolved or Raman) during qubit initialization and/or read-out.

Figure 5:
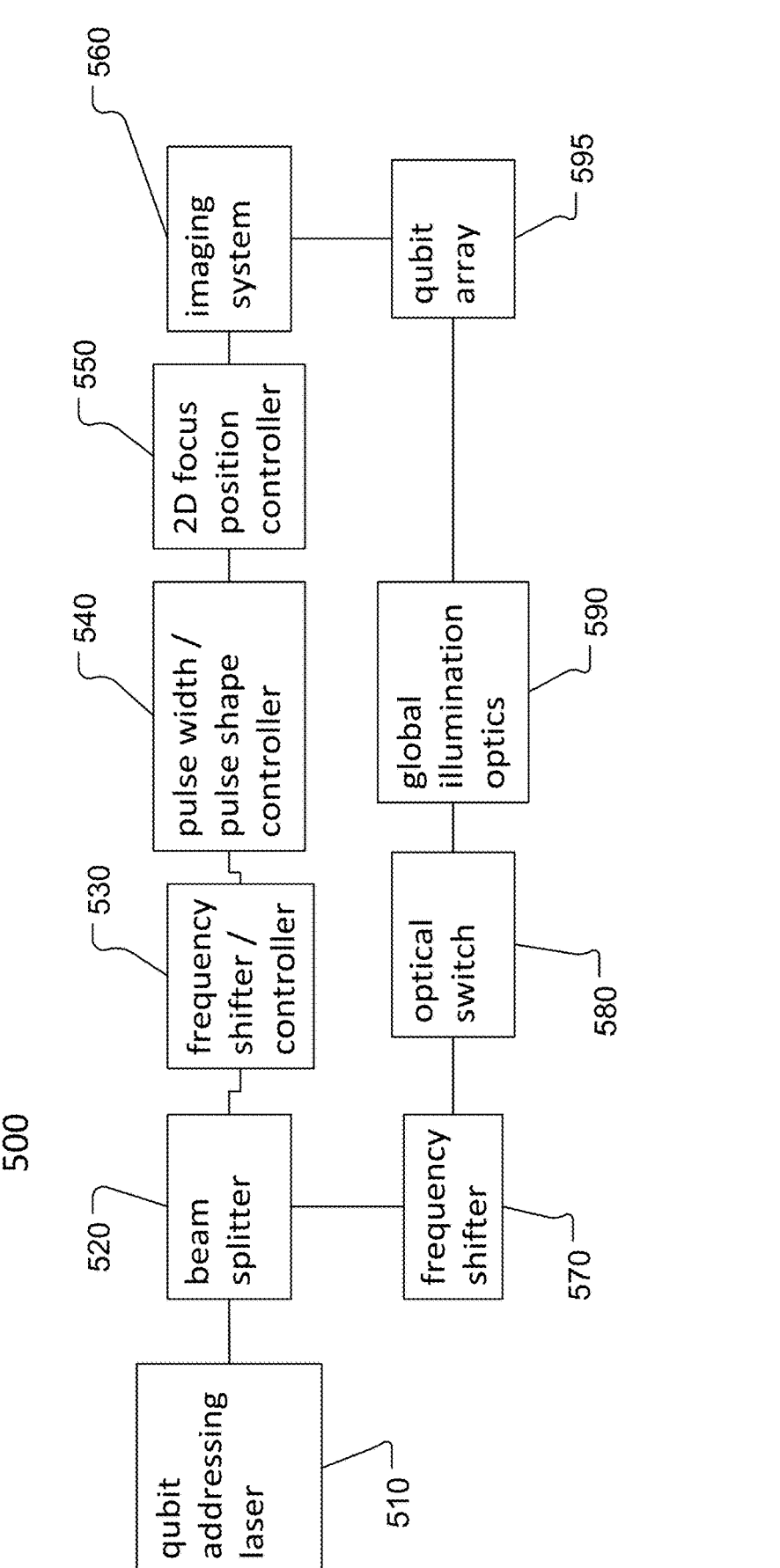
FIG. 5 shows a block diagram of an exemplary qubit addressing laser system according to a possible implementation of the present disclosure.
Figure 6:
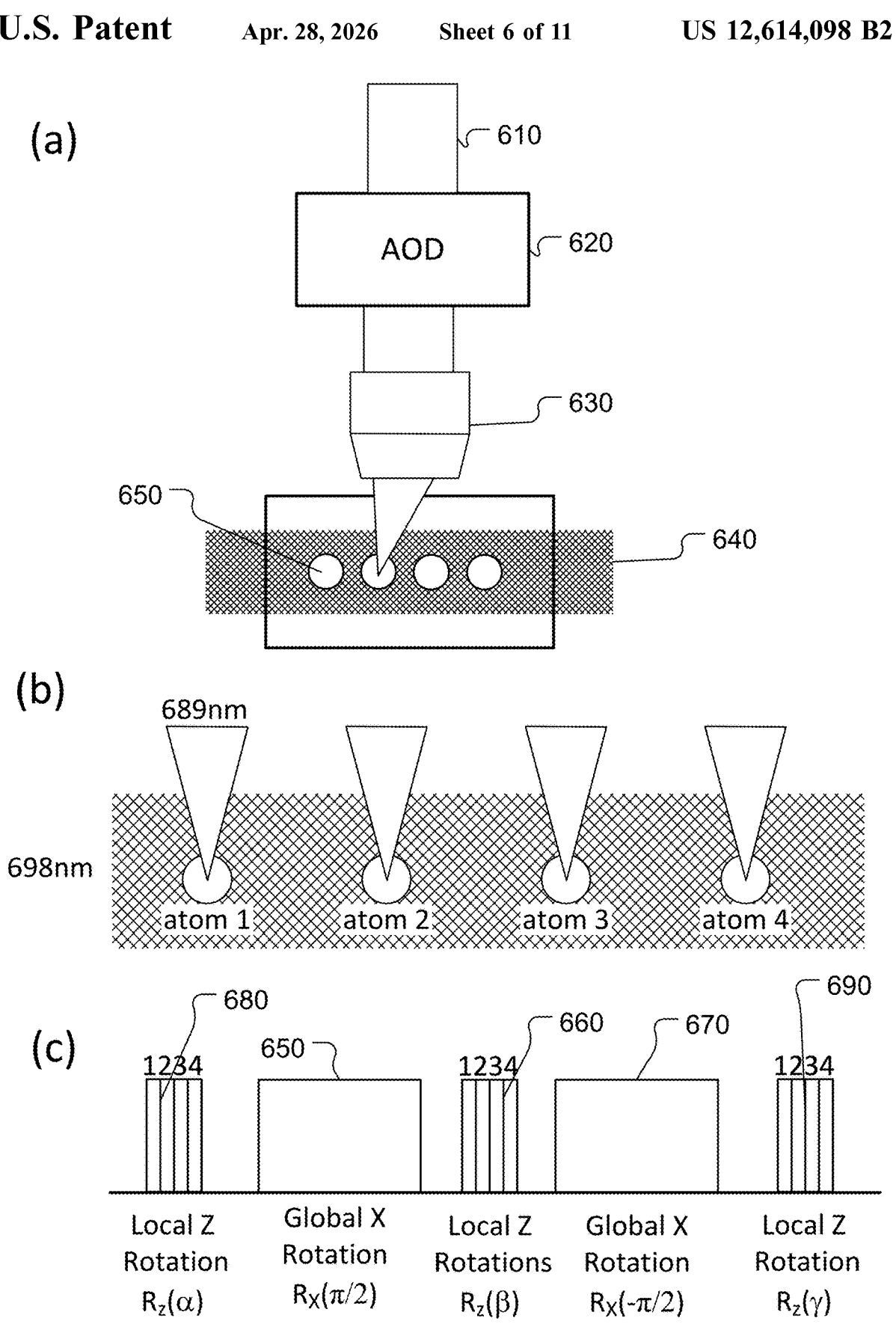
FIGS. 6(*a*), (*b*) and (*c*) illustrates how local single-qubit gates with arbitrary SU(2) rotations can be realized according to a possible implementation of the present disclosure.

For example, as illustrated in FIG. 5 and FIG. 6 below, position control for quantum gate lasers can be achieved using acousto-optic deflectors (AODs), where an applied radiofrequency (RF) drive tone causes an angular deflection of laser beams transmitted through the AOD. Multiple RF tones can be applied to split a single beam into multiple beams where the deflection angle is configurable via controlling the RF frequency of the drive tones. However, in such a local qubit addressing system, the light passing through the AOD is also frequency-shifted by the RF tone, which leads to spatially dependent laser frequencies of the local addressing beams, which may be a problem for conventional qubit gate schemes. Usually, this problem is fixed using additional frequency shifters for compensation, further increasing hardware complexity and possible error sources of conventional quantum computing devices. By contrast, in the methods, devices, and systems disclosed herein, the qubit addressing laser can be operated far-detuned from any atomic transition of the neutral atoms, such that the frequency shift caused by AODs or similar devices has a negligible effect, e.g. on gate fidelity and, thus, no compensation hardware is required when the present disclosure is applied to such position control systems.

As mentioned above, in some implementations, performing the local two-qubit gate operation may further involve globally illuminating the array of optical traps with a Rydberg laser pulse to coherently transfer the one or more pairs of qubits, prepared in the third internal state |c> of the neutral atoms, to a Rydberg state |r> of the neutral atoms, or to a superposition of the Rydberg state and the third internal state. Some two-qubit gates using Rydberg blockade for generating entanglement require applying a specific differential phase shift for the third internal state |c> and the Rydberg state |r>. Conventionally, such phase shifts require phase control for the Rydberg laser system (e.g. using an electro-optical-modulator (EOM)), further increasing hardware complexity. According to the present disclosure, such phase shifts needed for some Rydberg-blockade-based two qubit gates can also be generated by the qubit addressing laser system e.g. via inducing a differential AC Stark shift for |c> and |r> without substantial increase in hardware complexity. For example, the method described above may further comprise locally and selectively illuminating the one or more pairs of qubits with the qubit addressing laser at a fourth qubit addressing laser frequency to cause a differential AC Stark shift for the third internal state and the Rydberg state.

As discussed in detail with reference to FIG. 6 below, such a differential AC Stark shift for the third internal state and the Rydberg state may be applied in-between two consecutive Rydberg laser pulses, or during a single Rydberg laser pulse. In both cases, the differential Stark shift can be controlled such that after the gate sequence is completed, the pair(s) of qubits may be in an entangled state—which is essential for any useful quantum algorithm.

In some implementations, e.g. when the excited qubit state is implemented as an optical clock state such as the 3P0 state in 88Sr, the method described herein may further comprise generating a magnetic field at the location of the optical trap array that defines an angular momentum quantization axis for the neutral atoms and causes a perturbative admixture of the third internal state |c> to the qubit excited state |1>. In other implementations, also a different state with a non-vanishing dipole matrix element with the |0> state (a dipole-allowed state) may be perturbatively mixed to the |1> state. For example, such a magnetic field may be used to adjust the amount of perturbative admixture and thereby the lifetime of the qubit excited state |1> which decreases linearly with magnetic field strength. Since the linewidth of the qubit state transition from |0> to |1> essentially corresponds to the inverse lifetime of |1>, this allows to maximize the normalized Rabi frequency under the constraint that spontaneous emission from |1> is rare on time scales needed for quantum computation.

Aspects of the present disclosure further facilitate substantial improvements for gate timing and external noise suppression. For example, in some implementations, the method disclosed herein may further comprise performing multiple single-qubit and two-qubit gate operations, and periodically driving the qubit addressing laser to generate a first laser pulse train with a constant inter-pulse duration for performing the multiple single-qubit and two-qubit gate operations, which improves reliability and repeatability. Further, electronic control hardware and circuitry needed for driving optoelectronic pulse shaping equipment (e.g. AOMs, AODs, EOMs, etc.) may also be simplified. For example, a fixed RF pulse train may be used for driving the pulse shaping equipment of the local qubit addressing laser system, while atomic population and coherence control required for performing arbitrary single- and two-qubit gates can be realized by controlling the laser amplitude and/or the laser frequency. This allows for full control of the pulse area even for high RF pulse repetition frequencies, because the normalized pulse shape can be fixed and the peak pulse intensity and laser frequency can be controlled on a slower time scale corresponding to the inverse RF pulse repetition frequency and does not have to be done on the faster time scale corresponding to the pulse width.

Aspects of the present disclosure also allow for the reduction of negative effects caused by the optical trap array on single and two-qubit gates. For example, in some systems, two qubit gate fidelity benefits from a low trap depth in that it reduces motional dephasing during the Rydberg excitation. By contrast, single-qubit gates benefit from a high trap depth, e.g. from traps being in the Lamb-Dicke regime. Further, as mentioned above, larger magnetic fields may be used to allow for faster single-qubit gates—e.g. due to a larger admixture of the third internal state $|c>$ to the qubit excited state $|1>$. However, typically, this also requires deeper optical traps to maintain high single-qubit gate fidelity.

Figure 9:
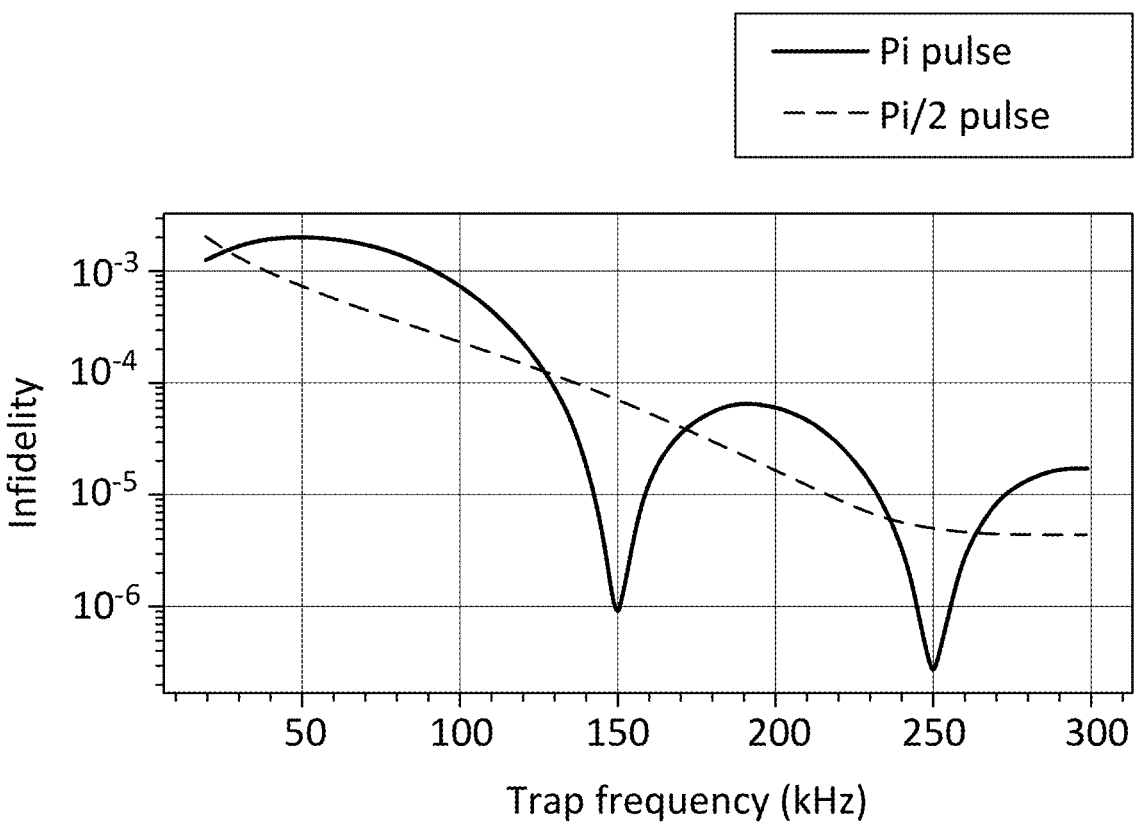
FIG. 9 illustrates how the single qubit pulse duration may be chosen to minimize single-qubit gate infidelity according to a possible implementation of the present disclosure.

To avoid or at least ameliorate such an optical trap depth trade-off between single and two-qubit gates, in some implementations of the present disclosure, the optical trap array may comprise/exhibit a trap frequency ω that is essentially the same for all qubits, and performing the local single-qubit gate operation may comprise illuminating the optical trap array with a single-qubit state transition laser pulse or two consecutive qubit state transition laser pulses having a (combined) effective pulse duration that equals $\omega/2\Omega=2n+1$, $n{\in}N$, where $\Omega$ is the Rabi frequency associated with the qubit state transition laser and the $|0>$ to $|1>$ transition matrix element. As shown in FIG. 9 below, obeying this condition minimizes motional dephasing during single-qubit gates. Thus, the quantum computing device can be operated at a lower trap depth while maintaining single qubit gate fidelity. The lower trap depth improves two-qubit gate fidelity and reduces negative effects caused by a high trapping laser intensity, such as off-resonant scattering, and may also allow for simplified, low-power design and operation of the trapping laser system. The same effect is found for local single qubit gates when choosing an appropriate waiting time between the two $\pi/2$ pulse described above.

In some implementations, methods described herein may further comprise synchronizing the periodic driving of the qubit addressing laser system (and, in some implementations, of the other laser systems described herein) with a characteristic frequency of an external noise source affecting qubit gate fidelity. For example, a pulse generator providing the periodic driving for the qubit addressing laser may act as a natural clock frequency for a quantum computing device. This allows for the synchronization of the pulse generator, which provides the periodic driving, to (quasi-) periodic environmental effects, such as fluctuations of ambient electromagnetic fields caused by the line frequency of an AC power grid which may cause transition frequency shifts, e.g. via the Zeeman effect. This synchronization of qubit gate operation to external noise sources enhances gate fidelity and repeatability of the quantum computing device.

In some implementations, the qubit addressing laser may also be driven periodically to generate a second laser pulse train with a constant inter-pulse duration. For example, a single laser source may be fed into two identical optoelectronic pulsing devices such as AOMs. In this manner, the spacing between the first laser pulse train and the second laser pulse train may be controlled, which allows phase control for two-qubit gates for use in optimized gate sequences.

The present disclosure also relates to a qubit addressing laser system and a quantum computing device adapted to carry out the methods disclosed herein. Such systems and devices, as well as further details of the methods described above, and a related computer program are discussed in the following with reference to exemplary implementations illustrated by the drawings. The foregoing broadly outlines the features and technical advantages of examples in accordance with the present disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

Various aspects of the present disclosure are described in more detail hereinafter with reference to the accompanying drawings. The present disclosure may, however, be implemented in many different forms and should not be construed as limited to any specific structure or function presented herein. Rather, these aspects are provided so that this disclosure will be thorough and complete, and will fully convey the scope of the present disclosure to those skilled in the art. Based on the teachings herein one skilled in the art should appreciate that the scope of the present disclosure is intended to cover any aspect of the present disclosure disclosed herein, whether implemented independently of or combined with any other aspect of the present disclosure. For example, a device or system may be implemented, or a method may be practiced using any number of the aspects set forth herein. In addition, the scope of the present disclosure is intended to cover such a device, system or method which is practiced using other structure, functionality, or structure and functionality in addition to or other than the various aspects of the present disclosure set forth herein. Any aspect of the present disclosure disclosed herein may be implemented by one or more elements of a claim. While specific feature combinations are described in the following with respect to certain aspects of the present disclosure, it is to be understood that not all features of the discussed examples must be present for realizing the technical advantages of the devices, systems, methods and computer programs disclosed herein. Disclosed aspects may be modified by combining certain features of one aspect with one or more features of other aspects. A skilled person will understand that features, steps, components and/or functional elements of one aspect can be combined with compatible features, steps, components and/or functional elements of any other aspect of the present disclosure.

Several aspects of quantum computation with neutral atoms will now be presented with reference to various devices, systems and methods that are described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

While aspects of the present disclosure are presented in the following using the bosonic Strontium isotope 88Sr as qubits, it is to be understood, that any other species of neutral atom with a suitable internal level structure may also be used in other implementations of the present disclosure.

FIG. 1 shows a quantum computing device 100 according to a possible implementation of the present disclosure that is configured for performing steps of a quantum computing method as disclosed herein (for example methods see FIG. 10 and FIG. 11 below). Neutral atoms that serve as qubits are trapped in an optical trap array 110 inside a vacuum chamber 120 that allows for optical access, e.g., a glass vacuum cell. The optical trap array 110 may be an array of optical dipole traps, e.g., generated using a digital micro mirror device (DMD), a spatial light modulator (SLM), or an integrated photonics unit for local addressing 130, and imaged to a plane inside the vacuum chamber 120 by a high-resolution imaging system 140. In other implementations, the optical trap array 110 may also be formed by individual planes of an optical lattice. To initialize an array of trapped qubits that can be used for quantum computations, usually, neutral atoms are first laser cooled, e.g., via a magneto-optical-trap (MOT) operated inside the vacuum chamber 120 and loaded from an atom source such as a Zeeman slower. Laser cooled neutral atoms can then be loaded into the optical trap array 110 and cooled further to or close to the motional ground state of the optical trap array 110 to initialize an array of essentially identical qubits. Further details of the qubit array initialization sequence are discussed with reference to FIG. 3 below.

As discussed in detail above, typically, two internal states of the neutral atoms serve as qubit ground state |0> and qubit excited state |1>. For example, a spin-singlet electronic ground state (e.g., 1S0) can serve as |0> and a metastable excited spin triplet state (e.g., 3P0) can serve as |1> (for details see the level scheme of 88Sr shown in FIG. 4 below). The qubits trapped in the optical trap array 110 thereby form an atomic quantum register that can be used for quantum computation and quantum simulation. To realize local single-qubit and two-qubit gates needed for quantum computation the quantum computing device 100 uses several laser systems to control the internal states of the neutral atoms. According to the present disclosure, local single-qubit gates with arbitrary SU(2) rotations can be realized using a (global) qubit state transition laser 150 in combination with a qubit addressing laser 160 that allows for selective and local control of individual qubits in the optical trap array 110.

In the example of FIG. 1, the qubit addressing laser system comprises a laser source comprised in the laser system rack 170, and an integrated photonics qubit addressing unit 162 coupled to the laser source via an optical fiber 164. The qubit addressing laser system further comprises a high-resolution imaging system 166, as well as laser frequency and pulse area (e.g., pulse shape and amplitude) controllers that may be included in the laser system rack 170 and/or in the integrated photonics qubit addressing unit 162 (for further details and options see FIG. 5). The quantum computing device 100 further comprises a modular control signal unit 180 generating various analog, digital and RF control and drive signals needed for precise and fully timed control of laser systems, a magnetic field system, a qubit read-out system (e.g., comprising a CMOS camera 195 for fluorescence imaging using the high-resolution imaging system 166 of the qubit addressing laser system), etc.

As discussed above, local two-qubit gates can be realized using a global Rydberg laser 190 in combination with the qubit addressing laser 160. According to the present disclosure, the qubit addressing laser system (for details see FIG. 5, FIG. 6 and FIG. 7) is configured for locally and selectively illuminating individual qubits with a qubit addressing laser pulse at a first qubit addressing laser frequency to cause a differential Stark shift for the qubit ground state |0> and the qubit excited state |1>, when the qubit is prepared in a superposition state |s>, e.g., via a preceding global π/2-pulse of the qubit state transition laser 150. For local two-qubits gates acting one individual pairs of qubits, the qubit addressing laser 150 can be controlled to locally and selectively illuminate one or more pairs of qubits prepared in the qubit ground state |0> with a qubit addressing laser pulse at a second qubit addressing laser frequency to transfer the one or more pairs of qubits to a third internal state |c> of the neutral atoms that may serve as an initial state for an optical transition to a Rydberg state |r> of the neutral atoms and/or as a shelving state used for state selective read-out. Details of single and two-qubit gates using the qubit addressing laser 150 together with the qubit state transition laser 150 and the Rydberg laser 190 are described below with reference to FIG. 6 and FIG. 7 below.

As disclosed herein, both, the qubit state transition laser system and the Rydberg laser system do not require local control for realizing arbitrary single and two qubit quantum gates. Instead, both laser systems can be designed such that they only need to globally illuminate the optical trap array 110, while only the qubit addressing laser system needs to include opto-electronic control equipment for selectively and locally illuminating individual qubits, and pairs of individual qubits in the optical trap array. As discussed above, the qubit addressing laser system may also be used for laser cooling (e.g., sideband cooling) of the neutral atoms during qubit array initialization and/or during qubit state readout to further reduce hardware complexity.

The modular control signal unit 180 and, optionally, the laser system rack 170 may obtain single-qubit and two-qubit gate operation instructions of a quantum computing protocol (e.g., from a digital computer 195 or via an interface to a cloud-computing system) and, in response, control operation of the qubit addressing laser 150 to locally and selectively illuminate individual qubits and pairs of individual qubits to perform single and two-qubit gate operations according to the obtained qubit gate operation instructions. Similarly, the modular control signal unit 180 may also obtain and process instructions for qubit array initialization and/or qubit readout as disclosed herein.

Figure 2:
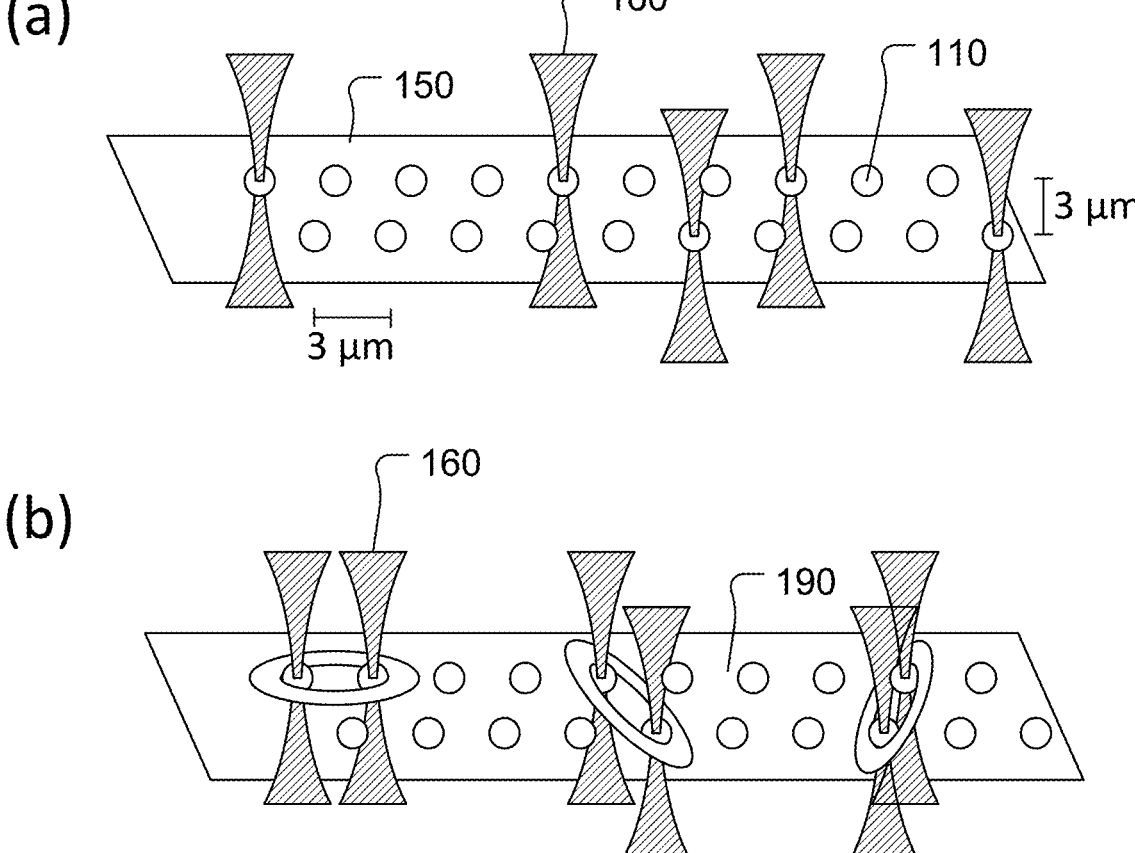
FIGS. 2(*a*) and (*b*) illustrates position control for local single-qubit gates and local two-qubit gates according to a possible implementation of the present disclosure.
Figure 7:
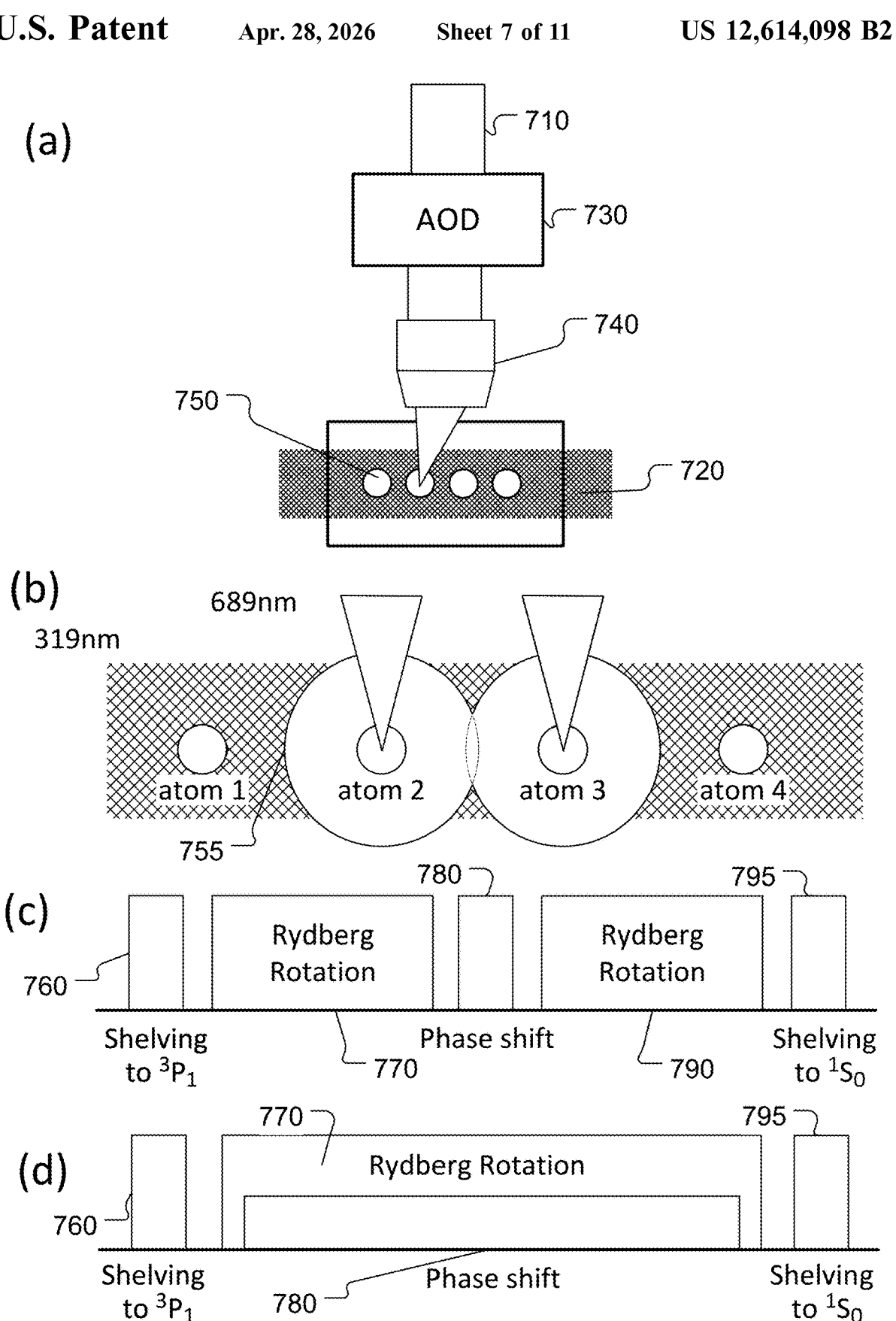
FIGS. 7(*a*), (*b*), (*c*) and (*d*) illustrates how local two-qubit gates using Rydberg-blockade can be realized according to a possible implementation of the present disclosure.

FIG. 2 shows zoom-in on a portion of the optical trap array 110 having a uniform spacing of 3 μm to illustrate conceptually how local single-qubit gates (see panel a) and local two-qubit gates (see panel b) can be realized with a quantum computing device as shown in FIG. 1. For single-qubit gates the optical trap array 110 is globally illuminated by the qubit transition laser 150 to transfer illuminated qubits prepared in the qubit ground state |0> to a superposition state |s> of qubit ground state |0> and qubit excited state |1>. The qubit addressing laser 160 can be controlled to selectively and locally illuminate individual qubits to generate arbitrary SU(2) rotations, e.g., via a laser pulse sequence as illustrated in FIG. 5 below and described above. For two-qubit gates the optical trap array 110 is globally illuminated by the Rydberg laser 190 to couple the third internal state |c> to the Rydberg state |r>. The qubit addressing laser 160 can be controlled to selectively and locally illuminate individual qubits to perform Rydberg-blockade-based two-qubit gates as illustrated in FIG. 7 below.

In general, the present disclosure thus also relates to a neutral atom quantum computing device 100, that may comprise a trapping laser system creating an array of optical traps 110 for neutral atoms that serve as qubits for the quantum computing device 100, wherein a first internal state of the neutral atoms serves as qubit ground state |0>, and a second internal state serves as qubit excited state $|1\rangle$. The disclosed quantum computing device may also comprise a qubit state transition laser system configured for globally illuminating the array of optical traps 110 to transfer qubits prepared in the qubit ground state $|0\rangle$ to a superposition state $|s\rangle$ of qubit ground state $|0\rangle$ and qubit excited state $|1\rangle$. The device 100 may further a qubit addressing laser system (for an example see FIG. 5 below) configured for locally and selectively illuminating two or more individual qubits to cause a differential Stark shift for a qubit in the superposition state $|s\rangle$ for a first qubit addressing laser frequency; and to couple a pair of qubits to a Rydberg state $|r\rangle$ of the neutral atoms, preferably via a third internal state $c\rangle$ of the neural atoms that can serve as an intermediate state of a two-photon transition from the qubit ground state $|0\rangle$ to the Rydberg state $|r\rangle$ (for details of a possible implementation using bosonic 88Sr atoms see FIG. 4). As discussed above, the quantum computing device 100 may further comprise a Rydberg laser system configured for globally illuminating the array of optical traps 110 to couple the third internal state $c\rangle$ to the Rydberg state $|r\rangle$, and a qubit readout system using fluorescence emitted by the trapped atoms during a qubit readout sequence.

As disclosed herein, such a neutral atom quantum computing device 100 may comprise means/may be configured to carry out the quantum computations methods disclosed herein, such as the methods discussed above and below with reference to FIG. 10 and FIG. 11. In particular, the neutral atom quantum computing device 100 may comprise a qubit addressing laser system as disclosed herein, e.g. as discussed above or with reference to FIG. 5 below. For example, the neutral atom quantum computing device 100 may comprise a magnetic field system to generate a magnetic field at the location of the optical trap array 110 that defines an angular momentum quantization axis for the neutral atoms and causes a perturbative admixture of a dipole-allowed state to the qubit excited state.

Figure 3:
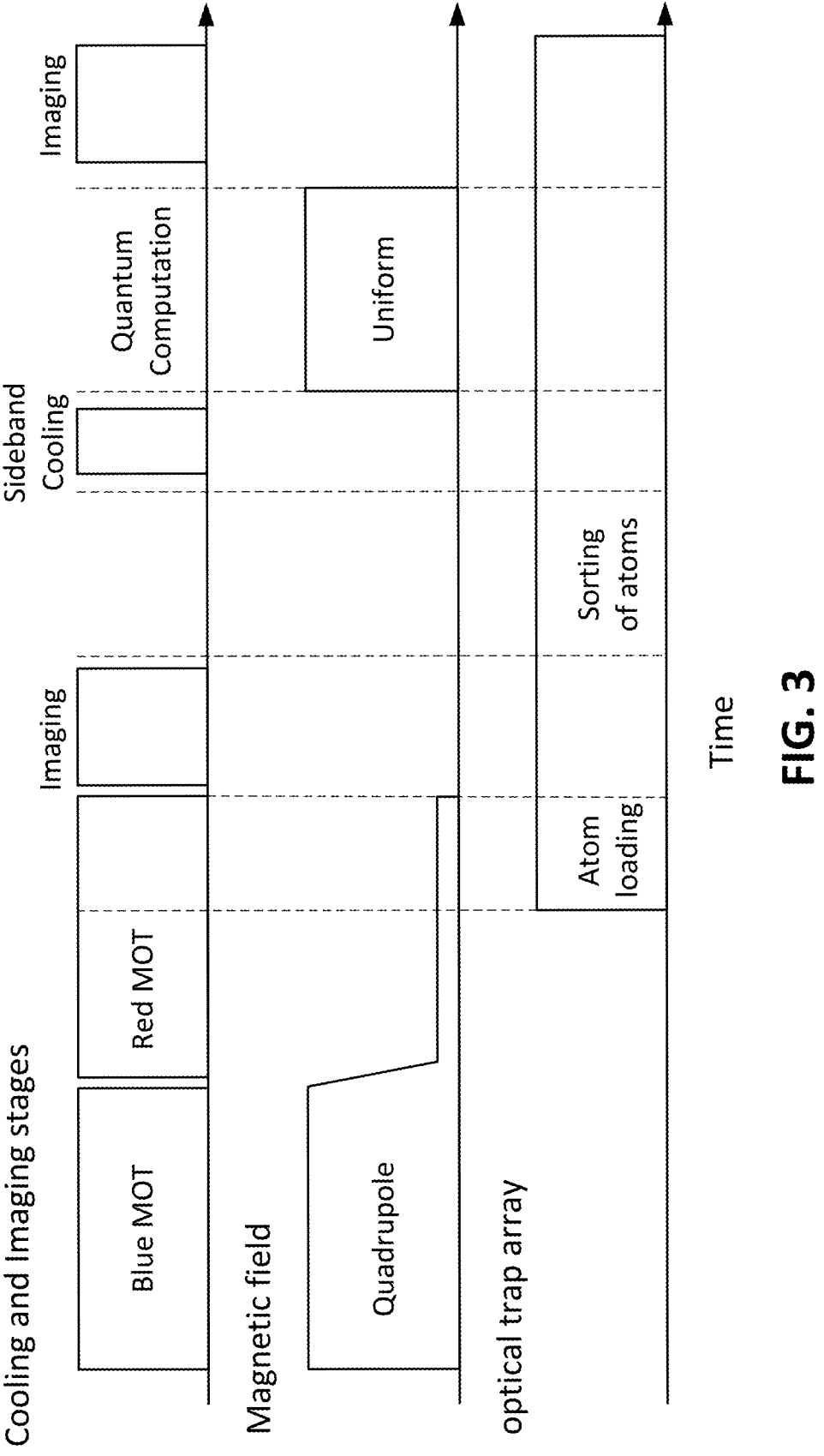
FIG. 3 illustrates a typical operation sequence of a neutral atom quantum device according to a possible implementation of the present disclosure.

FIG. 3 illustrates a typical operation sequence of a neutral atom quantum device according to a possible implementation of the present disclosure such as the quantum computing device 100 shown in FIG. 1. The exemplary operation sequence starts with laser cooling of neutral atoms. In the shown example, neutral 88Sr atoms are first laser cooled using a blue MOT e.g. operated using the broad 1S0 to 1P1 transition (see FIG. 4 below) followed by a red MOT operated on the narrower 1S0 to 3P1 transition that is also used by the qubit addressing laser. The substantially narrower linewidth of the 1S0 to 3P1 transition allows to further decrease the temperature of the 88Sr atoms due to the lower Doppler cooling limit that is proportional to the natural linewidth of the laser cooling transition.

Laser cooled neutral atoms are then loaded into the optical trap array to form a qubit array and are then imaged, e.g., via fluorescence imaging comprising sideband cooling as described below, to detect potential defects in the qubit array that can then be removed during a subsequent atom sorting procedure resulting in a qubit array with unity filling. Next, sideband cooling e.g., using the qubit addressing laser system cools the neutral atoms to or close to the motional ground state of the optical trap array to prepare an array of essentially identical qubits that may then be used to execute quantum computation protocols typically comprising execution of multiple local single and local two-qubits gates. At the end of the quantum computation phase the internal state of the qubits can be read-out, e.g., via loss-less and state-sensitive fluorescence imaging as discussed with reference to FIG. 8 below. Performing sideband cooling, e.g., using a global illumination path of the qubit addressing laser system (cf. FIG. 5 below) during and/or after the qubit read-out sequence allows to reuse the qubit array for performing a subsequent quantum computation protocol without the need to perform laser cooling and optical trap loading to initialize the qubit array.

Figure 4:
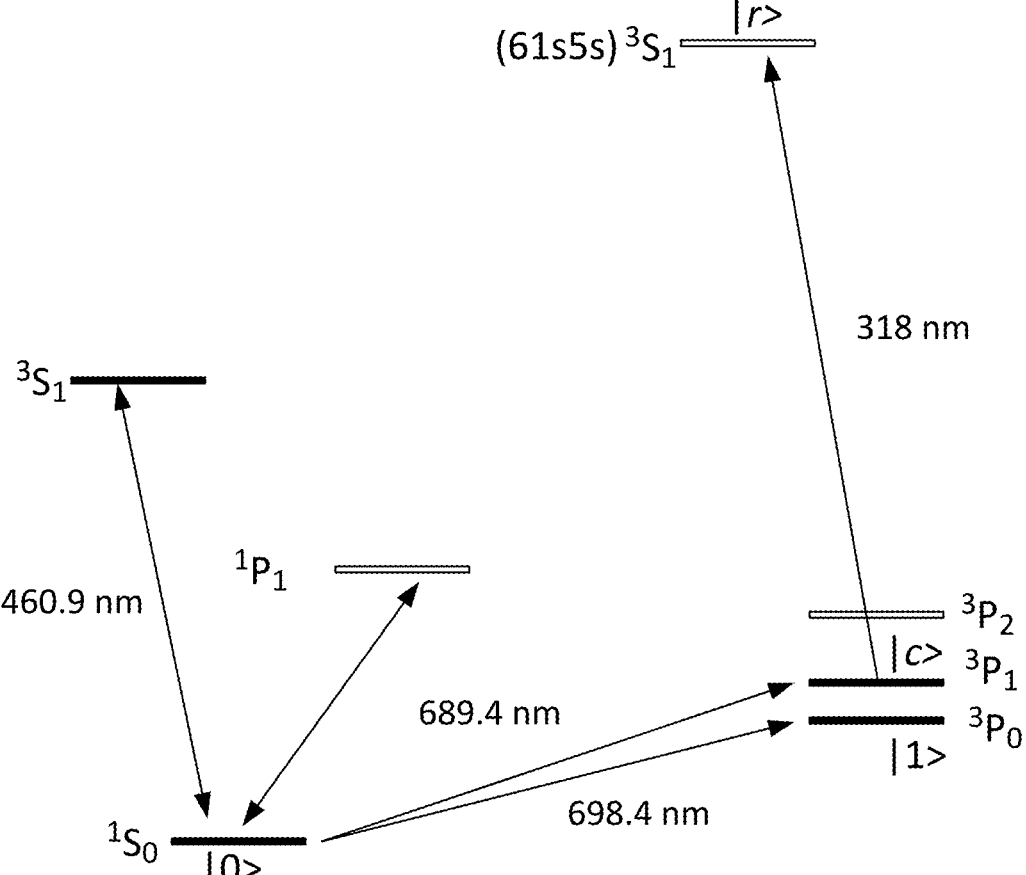
FIG. 4 shows an atomic level scheme of the bosonic strontium isotope 88Sr that can be used as physical qubit in some implementations of the present disclosure.

FIG. 4 shows an atomic level scheme of the bosonic Strontium isotope 88Sr that can be used as physical qubit in some implementations of the present disclosure. In such implementations, the qubit ground state $|0\rangle$ can be implemented by the spin singlet state 1S0 of the electronic ground state and the qubit excited state $|1\rangle$ can be implemented by the 3P0 state of the first electronic excited state. As known in the art, the dipole transition matrix element for these two states vanishes due to angular momentum selection rules and $|1\rangle$ is a metastable excited state with a long lifetime as compared to typical time scales of quantum computation protocols.

As disclosed herein, a qubit addressing laser system can operate with a design wavelength of 698.4 nm corresponding to the 1S0 to 3P1 transition, with a natural linewidth of approximately $2\pi\cdot7$ kHz. The 3P1 state of 88Sr is an example of an internal state (designated as third internal state $|c\rangle$ above) that may be used to realize a two-photon coupling between the qubit ground state $|0\rangle$ and the Rydberg state $|r\rangle$ needed for two-qubit gates. For example, the state $|c\rangle$ may serve as an initial state for an optical transition to a highly excited Rydberg state $|r\rangle$ used for two-qubit gate schemes as described below with reference to FIG. 7. When the laser frequency of the qubit addressing laser is resonant with the $|o\rangle$ to $|c\rangle$ transition, the qubit addressing laser system can selectively and locally transfer one or more individual qubits to the third internal state $|c\rangle$, a process sometimes designated as shelving. Thus $|c\rangle$ is also designated as a shelving state herein. For example, qubits can be shelved in $|c\rangle$, e.g., during state selective imaging as discussed below.

When operated slightly detuned (e.g., within 100 kHz) from the 1S0 to 3P1 resonance the qubit addressing laser can also be used for sideband cooling of the neutral atoms, e.g., during qubit array initialization and/or qubit state readout. For local single qubit gates with arbitrary SU(2) rotations, the qubit addressing laser can also be operated farther detuned (e.g., ~1 Ghz) from the 1S0 to 3P1 resonance thereby causing a differential AC Stark shift for the $|0\rangle$ and the $|1\rangle$ states when the qubit is prepared in a superposition state $|s\rangle$ such as $1/\sqrt{2}\ (0\rangle+|1\rangle)$, e.g., via a preceding global $\pi/2$-pulse from the qubit state transition laser on resonance on the 1S0 to 3P0 transition. Due to the detuning, the AC Stark shift can be applied essentially without populating the 3P1 state.

Atoms transferred to the 3P1 shelving state $|c\rangle$, can also be transferred to the Rydberg state $|r\rangle$ e.g., via a global $\pi$-pulse generated by the Rydberg UV-laser system operating at a design wavelength of 318.5 nm. Thus, operating the qubit addressing laser at two different laser frequencies allows to realize local single and local two qubit gates without requiring a selective position control for the qubit state transition laser system and for the Rydberg laser system. As mentioned above, the qubit state transition laser system and the Rydberg laser system can thus be operated at a fixed laser frequency and don't require sophisticated optoelectronic hardware for position control and arbitrary pulse area control.

As mentioned above, initial laser cooling of the 88Sr atoms, e.g., for operating a Zeeman slower or a blue MOT can be performed on a broad, dipole-allowed 1S0 to 1P1 transition at a design wavelength of ~460.9 nm. The same transition can also be used for fluorescence imaging during qubit state readout (see FIG. 8 below).

FIG. 5 shows a functional block diagram of a qubit addressing laser system 500 according to a possible implementation of the present disclosure. The qubit addressing laser system 500 includes a laser source 510, e.g., an extended-cavity diode laser amplified by a tapered amplifier and frequency stabilized to a high-finesse cavity by the Pound-Drever-Hall technique. In other implementations, a laser amplifier may be injection locked to an extended-cavity diode laser that may be frequency stabilized to a frequency comb. In the illustrated example, the output of the laser source 510 may be split into two paths by a beam splitter 520, e.g., a polarizing beam splitter or a similar optical element, wherein the first path can be used for selective and local illumination of individual qubits and the second path can be used for global illumination of the qubit array. In other implementations, instead of using a beam splitter, the laser source 510 may comprise two or more individual lasers employing a relative frequency stabilization mechanism, such as injection locking, optical beat locking, etc. to provide two independent illumination paths at with shifted laser frequency.

The first output of the beam splitter 520 may go through a controllable laser frequency shifter 520, such as an Acousto-Optic Frequency Shifter (AOFS) that modifies the frequency of the optical beam via the Doppler effect. The acoustic wave travelling through the device's crystal causes the frequency of the laser beam to change in proportion to an RF driving frequency. For example, an AOM in double-pass configuration or a fiber-coupled laser frequency shifter can be used to apply a controllable frequency shift as large as 1.5 GHz while essentially maintaining laser beam pointing stability.

For precise pulse width and/or pulse shape control, an optical pulse width/pulse shape controller 530, such as an AOM driven by a controllable RF signal can be employed. To improve stability and ensure independent parameter control, it typically makes sense to use a separate device for frequency shifting and another one for precise pulse width and/or pulse shape control. However, pulse width/shape control can also be performed via the frequency shifter 520, e.g., via driving the frequency shifter with pulsed RF signal of controllable pulse width/shape. For complete stray light suppression, both paths may also comprise an optomechanical switch/shutter.

To realize selective and local addressing of individual qubits in the optical trap array 395, the qubit addressing laser system 500 further comprises a 2D focus position controller 550 followed by a high-resolution imaging system 560 as shown in the example of FIG. 1. Combined, the optical elements 520 to 560 allow to selectively address one or more qubits in the optical trap array 595 with at a controllable laser frequency and with a controllable pulse area. For example, for performing four identical single qubit gates the frequency shifter 520 can be controlled, e.g., via controlling the frequency of the RF driver to shift the laser frequency to be red detuned with respect to the |0> to |c> transition thereby causing a differential AC Stark shift for qubits in the superposition state |s>. The phase difference between |0> and |1> needed for arbitrary SU(2) rotations can be controlled using the pulse width/pulse shape controller 530 to adjust the pulse area of the laser pulse causing the differential Stark shift while selective qubit addressing is provided by the 2D focus position controller 550.

The 2D focus position controller 550 may comprising two orthogonal AODs in series that are driven by multiple RF tones with controllable RF frequency. In other implementations, focus position control may also be realized using a DMD, an SLM or integrated photonics addressing unit as shown in FIG. 1. The controllable laser focus pattern generated by the 2D focus position controller 550 may then be imaged, by the high-resolution imaging system 560, to individual qubits in the optical trap array (see FIG. 2) that need to be addressed during local single qubit or two qubit gates and/or for selective shelving to the 3P1 state.

In the shown example, the second output of the beam splitter 520 can be used for global illumination of the optical trap array 595, e.g., as discussed above, for sideband cooling during an initialization sequence and/or a qubit read-out sequence. The global illumination path may comprise a frequency shifter 570, that may operate at an essentially fixed frequency shift needed for sideband cooling and an optical switching device 580 which may be a pulse width/shape controller as discussed for the local and selective path above or may be realized using simpler hardware. Evidently, for the global illumination path, a 2D focus position controller and a high-resolution imaging system are not necessary. Instead, global illumination optics such as an optical fiber and a beam collimator may be used to globally illuminate the optical trap array 395.

Thus, in general, the present disclosure also relates to a qubit addressing laser system 500 for a quantum computing device 100 that uses neutral atoms trapped in an array of optical traps 110 as qubits. The qubit addressing laser system 500 may comprise a laser source 510 providing laser light with a design wavelength corresponding to a transition between a first internal state and a second internal state of the neutral atoms that serve as qubit states |0> and |1> as discussed above. The qubit addressing laser system 500 may comprise a laser frequency controller/shifter 530 to set the frequency of laser light provided by the qubit addressing laser system 500 to a first laser frequency and to a second laser frequency, as well as a pulse width or pulse shape controller 540 to generate laser pulses with a controllable pulse width or pulse shape/area, such that, for the first laser frequency, a phase difference for the qubit ground state |0> and the qubit excited state |1> of a qubit superposition state |s> can be controlled between 0° and 180°, and such that, for the second laser frequency, the qubit ground state |0> can be transferred to a third internal state |c> of the neutral atoms that can serve as intermediate state for a two-photon transition to a Rydberg state |r> of the neutral atoms. The qubit addressing laser system 500 may also comprise a laser focus position controller 550 that controls focus positions of the laser light provided by the qubit addressing laser system 500 such that at least two neutral atoms trapped in the array of optical traps 110 can selectively and locally be illuminated simultaneously, e.g., via a high-resolution imaging system 560.

In some implementations of the present disclosure, the laser focus position controller 550 may comprises one or more of an acousto-optic deflector, a digital micromirror device, a spatial light modulator, an electro-optic deflector, and an integrated photonics unit for local addressing 162. Further, the laser frequency controller 530 may comprises one or more of an acousto-optic modulator, an acousto-optic-frequency shifter, and an optical phase locked loop, and, in some implementations, the pulse width or pulse shape controller 540 may comprise one or more of an acousto-optic modulator, an acousto-optic deflector, an electro-optic-modulator, and an electro-optic deflector.

Further, the laser frequency controller 530 or an additional laser frequency controller such as a fixed frequency shifter 570 may be configured to set the frequency of the laser light provided by the qubit addressing laser system 500 to a third laser frequency. As shown in FIG. 5, the qubit addressing laser system 500 may further comprise a global illumination path to globally illuminate the optical trap array 110 with laser light at the third laser frequency to cool trapped atoms via sideband cooling.

FIG. 6 conceptually illustrates how local single-qubit gates can be realized according to implementations of the present disclosure. In panel a) of FIG. 6 one dimensional selective qubit addressing by a qubit addressing laser beam 610 combined with global illumination by a qubit state transition laser beam 620 is illustrated. As described above, the qubit addressing laser system may include an AOD 630 and a large NA imaging objective 640 focusing the output beam(s) of the AOD 630 to an array of optical traps 650 trapping neutral atoms that serve as physical qubits. As mentioned above, the focus position(s) of the qubit addressing laser beam 610 can be controlled by changing the frequency of the RF signal driving the AOD 630. For example, multiple qubits can be addressed simultaneously via driving the AOD 630 with an RF drive signal comprising two or more different RF frequencies, e.g., via a multi-tone RF signal, wherein each tone corresponds to a different deflection angle of the AOD 630. Two-dimensional position control can for example realized by using two orthogonal AODs 630 in series.

Panel b) of FIG. 6 shows a configuration where all atoms are simultaneously illuminated by a global qubit transition laser beam 620 and a local qubit addressing laser pulse 610 locally illuminating all qubits to be addressed simultaneously, e.g., via driving the AOD 630 with a four-tone RF drive signal.

Panel c) of FIG. 6 illustrates an exemplary pulse sequence for performing a single qubit gate on all four atoms shown in panel b) previously prepared in the qubit ground state |0>, e.g., via a qubit array initialization procedure. The shown single qubit gate operation comprise a first global qubit state transition laser pulse 650 (e.g., a $\pi/2$-pulse) transferring the four qubits prepared in state |0> to a superposition state |s>, e.g., $|s>=1/\sqrt{2}$ (0>+|1>). Next, each atom may be illuminated locally and selectively, by a separate qubit addressing laser pulse 660, causing a differential AC Stark shift resulting in a phase difference $\Delta\varphi$ between |0> and |1>, e.g., $|s^*>=1/\sqrt{2}$ (0>ei$\Delta\varphi$+|1>).

As illustrated by the numbers 1, 2, 3, and 4 in FIG. 6, the AC Stark shift pulse 660 can be applied sequentially for each individual qubit or they may also be applied simultaneously for all addressed qubits. Via controlling the pulse area of the qubit addressing laser pulse 660, e.g., via controlling pulse duration, amplitude, or shape and/or via applying multiple pulses the relative phase difference $\Delta\varphi$ between 0> and |1> can be adjusted to any value between from 0° to 180°.

Next, a second global qubits transition laser pulse 670 is applied that transfers all atoms that were not illuminated by the local AC Stark shifting pulse back to |0>, e.g., using a second $\pi/2$ pulse with a 180° phase difference with respect to the first qubit state transition laser pulse 650. Since the phase difference between |0> and |1> of the addressed qubits can be controlled between 0° and 180°, such a single qubit gate pulse sequence allows to perform arbitrary SU(2) rotations for the atoms addressed by the qubit addressing laser.

In some implementations, the single-qubit gate sequence shown in panel b) of FIG. 6 may comprise additional AC Stark shift pulses 680 and 690 that may be needed for quantum computation protocols where the addressed qubits are not initially prepared in the qubit ground state |0>, but in a general superposition state of qubit ground state |0> and qubit excited state |1>.

FIG. 7 illustrates how local two-qubit gates, that are needed for generating entanglement (e.g., Bell states, W-states, GHZ-sates, etc.) during quantum computation can be realized according to implementations of the present disclosure. In panel a) one dimensional selective addressing of pairs of individual qubits by a qubit addressing laser beam 710 combined with global illumination by a Rydberg transition laser beam 720 is illustrated. As described above, the qubit addressing laser system may include an AOD 730 and a large NA imaging objective 740 focusing the output beam(s) of the AOD 730 to an array of optical traps 750 trapping neutral atoms as physical qubits. As mentioned above, the focus position(s) of the qubit addressing laser beam 710 can be controlled by changing the frequency of the RF signal driving the AOD 730. For example, multiple qubits can be addressed simultaneously via driving the AOD 730 with a multi-tone RF drive signal.

For performing a local two qubit gate, in a possible implementation of the present disclosure, two neighboring atoms, e.g., atom 2 and atom 3 in panel b) are first transferred to the shelving state |c> via a selective and local qubit addressing laser pulse 760. Next, the optical trap array 750 is globally illuminated by a Rydberg laser pulse 770 that only interacts with atoms prepared in the shelving state |c> or the Rydberg state |r>. Due to Rydberg-blockade caused by dipole interactions between atom 2 and atom 3 in the Rydberg state |r> as indicated by the circles 755 in panel b), even a global Rydberg laser $\pi$-pulse does not transfer both atoms 2 and 3 from the shelving state |c> to the Rydberg state |r> but generates a two-qubit entangled state such as $|e>=1/\sqrt{2}$ (|c>|r>+|r>|c>) where only one qubit is in the Rydberg state |r> and the other remains in the shelving state |c>. Typically, more general superposition states can also be generated when performing a two-qubit gate based on Rydberg-blockade. As known in the art, Rydberg rotation 770 may also done detuned from resonance, e.g., for implementing a Lavine-Pichler gate or a time optimal gate as mentioned above.

To transfer entanglement between atom 2 and atom 3 from the states |c> and |r> to the qubit states |o> and |1>, the qubit addressing laser can be used to generate a controlled phase shift for |c> and |r> for both atoms during the two-qubit gate sequence. For example, as shown in panel c) a phase shifting pulse 780 can be interspersed with two global Rydberg laser pulses 770 and 790. To maintain entanglement for atom 2 and atom 3 after the inverse shelving pulse 795, the pulse duration of the phase shifting pulse 780 and the detuning of the Rydberg laser can be controlled to realize a controlled phase gate.

An alternative two-qubit gate scheme is illustrated in panel d) of FIG. 7, where the phase shifting pulse 780 is applied during a single global Rydberg laser pulse 770, to maintain entanglement after the inverse shelving pulse 790. As discussed for FIG. 1 above, in other implementations, selective laser position control for the qubit addressing laser 710 can be realized using different technology, such the integrated photonics addressing units 130, 162 shown in FIG. 1.

Figure 8:
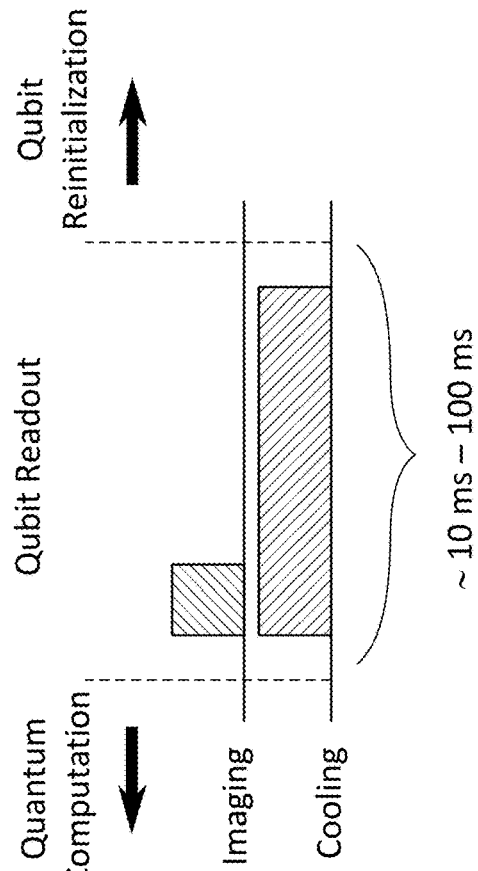
FIG. 8 illustrates aspects of qubit initialization and readout according to some implementations of the present disclosure.
Figure 8:
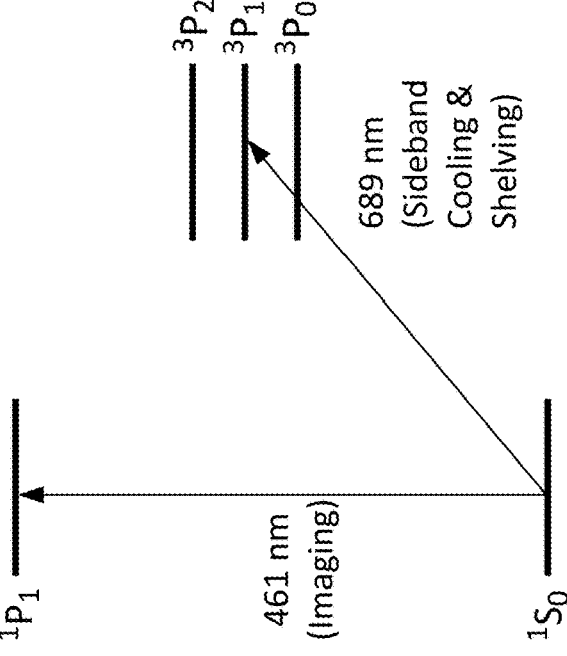

FIG. 8 illustrates how the qubit addressing laser can also be used for sideband cooling during a qubit readout sequence based on fluorescence imaging on the 1S0 to 1P1 transition in 88Sr using an imaging laser with a design wavelength of 461 nm. During read-out the optical trap array is illuminated by the imaging laser such that atoms excited to the 1P1 state spontaneously decay to the 1S0 state via emitting a fluorescence photon that can be detected by a CMOS camera (see FIG. 1). Due to the cycling nature of this transition, multiple fluorescence photons can be collected for each qubit in the 1S0 state to detect which qubits where in the |0> state at the end of a proceeding quantum computation sequence. To avoid heating and loss during fluorescence imaging, the optical trap array can simultaneously be illuminated by the qubit addressing laser at the third laser frequency to perform sideband cooling counteracting the heating caused by the imaging laser and the recoil of spontaneous emission of fluorescence photons.

In this manner, qubits are not lost during imaging and can be reused for additional quantum computation sequences. The qubits addressing laser can also be used to detect which qubits are in the |1> state without losing the qubits that are in the |0> state. To do so, qubits that are in the |0> state are transferred to the shelving state |c> before qubits in the |1> state are transferred to the |0> state and imaged as described above. Thus, the qubit addressing laser also allows state selective and essentially loss-less qubit readout substantially improving cycle times and reducing hardware complexity as compared to conventional systems.

FIG. 9 illustrates how, according to the present disclosure, the effective (combined) pulse duration of a single π-pulse or two consecutive π/2-pulses of the (global) qubit state transition laser can be chosen to minimize gate infidelity caused by motional dephasing. As mentioned above, illuminating the optical trap array with a single qubit state transition laser pulse or with two consecutive qubit state transition laser pulses having an effective (combined) pulse duration that equals $\omega/\Omega=2n+1$, $n \in \mathbb{N}$, where $\Omega$ is the Rabi frequency associated with the qubit state transition laser and the |0> to |1> transition matrix element at a given magnetic field. As can be clearly seen from the full-line plot for the π-pulse in FIG. 9, where $\Omega$ was set to 50 kHz during the simulation, the gate infidelity exhibits pronounced minima (note that the y-axis has a logarithmic scale) when the trap frequency $\omega$ equals $(2n+1)\,\Omega$, e.g., for $\omega=150$ kHz (n=1) and $\omega=250$ kHz (n=2) on top of the generally expected decay of the infidelity with larger trap frequency (i.e., smaller Lamb-Dicke factor).

For such pulses with a specifically chosen duration, it is thus possible to reach Rabi frequencies which are at least one third of the trap frequency without incurring loss of fidelity through motional dephasing. This behavior suggests that the motional excitations are minimal after completing an X-gate when the qubits state transition laser pulse fulfills the above condition for suitable choice of trap frequency $\omega$ and Rabi frequency $\Omega$. For example, it can be expected that n=1 may be optimal for the above-mentioned trade-off between single and two-qubit gate fidelity, which increases with decreasing trap frequency.

As mentioned above, the present disclosure allows to operate the qubit state transition laser as cleanly as possible facilitating low phase noise, as well as increased frequency and amplitude stability. As a result, the present disclosure allows to keep the effective Rabi frequency $\Omega$, which in general depends on phase noise, detuning with respect to the |0> to |1> transition, and laser pulse area, as stable as possible. Consequently, the present disclosure also increases the probability that a given π-pulse or a sequence of two consecutive π/2-pusles of the qubit state transition laser fulfills the above relation and thus minimizes motional dephasing.

FIG. 10 shows a process diagram of a method for quantum computing 1000. In step 1010, as described above, a local single-qubit gate operation may be performed comprising locally and selectively illuminating a qubit prepared in a superposition state with a qubit addressing laser at a first qubit addressing laser frequency, and in step 1020, as also described above, a local two-qubit gate operation comprising locally and selectively illuminating a pair of qubits prepared in the qubit ground state with the qubit addressing laser at a second qubit addressing laser frequency.

The method of FIG. 10 may further comprise performing, using the qubit addressing laser, sideband cooling during a qubit initialization sequence and/or during a qubit readout sequence, comprising globally illuminating the array of optical traps with the qubit addressing laser at a third qubit addressing laser frequency, or locally and selectively illuminating a qubit with the qubit addressing laser at the third qubit addressing laser frequency.

Further, in some implementations, the first internal state is an electronic ground state of the neutral atoms, and the second internal state is a metastable, long lived excited state of the neutral atoms. Further, performing the local single qubit gate operation 1010 may further comprise globally illuminating the array of optical traps with a first qubit state transition laser pulse to transfer qubits prepared in the qubit ground state |0> to a superposition state |s> of qubit ground state |0> and qubit excited state |1>, and globally illuminating the array of optical traps with a second qubit state transition laser pulse to transfer qubits prepared in the superposition state |s> to the qubit ground state |0>. Further, performing the local two-qubit gate operation 1020 may further comprise globally illuminating the array of optical traps with a Rydberg laser pulse to transfer the one or more pairs of qubits to the Rydberg state |r> of the neutral atoms, or to a superposition of the Rydberg state |r> and the third internal state |c>.

The method of FIG. 10 may further comprise locally and selectively illuminating the one or more pairs of qubits with the qubit addressing laser at a fourth qubit addressing laser frequency or at the first qubit addressing laser frequency to cause a differential AC Stark shift for the third internal state |c> and the Rydberg state |r> (for details see FIG. 7) as well as generating a magnetic field at the location of the optical trap array that defines an angular momentum quantization axis for the neutral atoms and causes a perturbative admixture of a dipole-allowed state (e.g., |c>) to the qubit excited state |1>.

In addition, performing the qubit initialization sequence (see step 1110 of FIG. 11) may comprise loading the plurality of neutral atoms into the optical trap array, performing the sideband cooling to transfer the neutral atoms into motional ground states of the optical trap array.

Further the method disclosed herein may also comprise performing the qubit readout sequence (see step 1140) may further comprise performing the sideband cooling while globally illuminating the optical trap array with an imaging laser, and imaging the qubits using fluorescence induced by the imaging laser. In some implementations, performing the qubit readout sequence (step 1140 in FIG. 11) may further comprise selectively and locally illuminating a qubit with a qubit addressing laser pulse at the second qubit addressing laser frequency to transfer the qubit to the third internal state |c> prior to imaging the qubits with the imaging laser.

In addition, the optical trap array may comprises a trap frequency $\omega$ that may essentially be the same for all qubits, and performing the local single qubit gate operation may comprises illuminating the optical trap array with a single qubit state transition laser pulse or with two consecutive qubit state transition laser pulses having an effective pulse duration that equals $\omega/\Omega=2n+1$, $n{\in}N$, where $\Omega$ is a Rabi frequency associated with the qubit state transition laser and the $|0>$ to $|1>$ transition (for details see FIG. 9). In some implementations, neutral atoms may comprise bosonic 88Sr atoms, and the qubit addressing laser may have a design wavelength of 689.4 nm, the Rydberg laser may have a design wavelength of 318.5 nm, and the qubit state transition laser may have a design wavelength of 698.4 nm. Further, the method disclosed herein may also comprise shifting the laser frequency of the qubit addressing laser to the first qubit addressing laser frequency, shifting the laser frequency of the qubit addressing laser to the second qubit addressing laser frequency, shifting the laser frequency of the qubit addressing laser to the third qubit addressing laser frequency.

In some implementations, the method disclosed herein may comprise performing multiple single-qubit and two-qubit gate operations, and periodically driving the qubit addressing laser to generate a first laser pulse train with a constant inter-pulse duration for performing multiple single-qubit and two-qubit gate operations. Further, the method disclosed herein may further comprise periodically driving the qubit addressing laser to generate a second laser pulse train with a constant inter-pulse duration, and controlling the spacing between the first laser pulse train and the second laser pulse train as well as synchronizing the periodic driving of the qubit addressing laser with a characteristic frequency of an external noise source affecting qubit gate fidelity.

Further, single-qubit and two-qubit gate operation instructions of a quantum computing protocol may be obtained, and the operation of the qubit addressing laser to locally and selectively illuminate a plurality of qubits and a plurality of pairs of qubits to perform single and two-qubit gate operations may be controlled according to the obtained qubit gate operation instructions.

FIG. 11 includes steps 1010 and 1020 of FIG. 10 designated as steps 1120 and 1130 as well as a step 1110, where as discussed above, a qubit initialization sequence may be performed using the qubit addressing laser at a third qubit addressing laser frequency, and step 1140, where, as also discussed above, a qubit readout sequence using the qubit addressing laser at the third qubit addressing laser frequency may be performed by a quantum computing device such as the possible implementation of FIG. 1.

The foregoing disclosure provides illustration and description, but is not intended to be exhaustive or to limit the aspects to the precise form disclosed. Modifications and variations may be made in light of the above disclosure or may be acquired from practice of the aspects. As used herein, the term component is intended to be broadly construed as hardware, firmware, or a combination of hardware and software. As used herein, a processor is implemented in hardware, firmware, or a combination of hardware and software.

It will be apparent that systems and/or methods described herein may be implemented in different forms of hardware, firmware, or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various aspects. In fact, many of these features may be combined in ways not specifically recited in the claims and/or dis-closed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchange-ably with "one or more." Where only one item is intended, the phrase "only one" or similar language is used. Also, as used herein, the terms "has," "have," "having," and/or the like are intended to be open-ended terms.

As used herein, the phrase "based on" shall not be construed as a reference to a closed set of information, one or more conditions, one or more factors, or the like. In other words, the phrase "based on A" (where "A" may be information, a condition, a factor, or the like) shall be construed as "based at least on A" unless specifically recited differently.

As used herein, the term "or" is an inclusive "or" unless limiting language is used relative to the alternatives listed. For example, reference to "X being based on A or B" shall be construed as including within its scope X being based on A, X being based on B, and X being based on A and B. In this regard, reference to "X being based on A or B" refers to "at least one of A or B" or "one or more of A or B" due to "or" being inclusive. Similarly, reference to "X being based on A, B, or C" shall be construed as including within its scope X being based on A, X being based on B, X being based on C, X being based on A and B, X being based on A and C, X being based on B and C, and X being based on A, B, and C. In this regard, reference to "X being based on A, B, or C" refers to "at least one of A, B, or C" or "one or more of A, B, or C" due to "or" being inclusive. As an example of limiting language, reference to "X being based on only one of A or B" shall be construed as including within its scope X being based on A as well as X being based on B, but not X being based on A and B.

Further, process diagrams such as FIG. 10 and FIG. 11 do not necessarily indicate a particular order or sequence of steps. For example, steps 1010 and 1120 of FIG. 10, or steps 1120 and 1130 in FIG. 11 may also be performed in a different order or, if hardware capabilities allow it, simultaneously, without deviating from the scope of the present disclosure.

While subject matter of the present disclosure has been illustrated and described in detail in the drawings and foregoing description, such illustration and description are to be considered illustrative or exemplary and not restrictive. Any statement made herein characterizing the disclosure or the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

What is claimed is:

1. A method for quantum computing using a plurality of neutral atoms in an array of optical traps, wherein a first internal state of the neutral atoms serves as qubit ground state |o>, and a second internal state serves as qubit excited state |1>, the method comprising:

performing a local single-qubit gate operation on a qubit comprising:

locally and selectively illuminating the qubit prepared in a superposition state |s> of qubit ground state |0> and qubit excited state |1> with a qubit addressing laser at a first qubit addressing laser frequency to cause a differential Stark shift for the qubit ground state |0> and the qubit excited state |1>; and performing a local two-qubit gate operation on a pair of qubits comprising:

locally and selectively illuminating the pair of qubits prepared in the qubit ground state |0> with the qubit addressing laser at a second qubit addressing laser frequency for coupling the pair of qubits to a Rydberg state |r> of the neutral atoms, wherein the pair of qubits are coupled to the Rydberg state |r>of the neutral atoms via a third internal state |c> of the neutral atoms that serves as an intermediate state of a two-photon transition from the qubit ground state |0> to the Rydberg state |r>.

2. The method of claim 1, further comprising:

performing, using the qubit addressing laser, sideband cooling during a qubit initialization sequence and/or during a qubit readout sequence, comprising:

globally illuminating the array of optical traps with the qubit addressing laser at a third qubit addressing laser frequency, or locally and selectively illuminating a qubit with the qubit addressing laser at the third qubit addressing laser frequency.

3. The method of claim 1, wherein the first internal state is an electronic ground state of the neutral atoms, and the second internal state is a metastable, long lived excited state of the neutral atoms.

4. The method of claim 1, wherein:

performing the local single qubit gate operation further comprises globally illuminating the array of optical traps with a first qubit state transition laser pulse to transfer qubits prepared in the qubit ground state |0> to a superposition state |s> of qubit ground state |0> and qubit excited state |1>, and globally illuminating the array of optical traps with a second qubit state transition laser pulse to transfer qubits prepared in the superposition state |s> to the qubit ground state |0>; and/or performing the local two-qubit gate operation further comprises globally illuminating the array of optical traps with a Rydberg laser pulse to transfer the one or more pairs of qubits to the Rydberg state |r> of the neutral atoms, or to a superposition of the Rydberg state |r> and the third internal state |c> of the neutral atoms that serves as the intermediate state of the two-photon transition from the qubit ground state |0> to the Rydberg state |r>.

5. The method of claim 4, further comprising locally and selectively illuminating the one or more pairs of qubits with the qubit addressing laser at a fourth qubit addressing laser frequency or at the first qubit addressing laser frequency to cause a differential AC Stark shift for the third internal state |c> and the Rydberg state |r>.

6. The method of claim 1, further comprising generating a magnetic field at a location of the array of optical traps that defines an angular momentum quantization axis for the neutral atoms and causes a perturbative admixture of a dipole-allowed state to the qubit excited state.

7. The method of claim 2, wherein the sideband cooling is performed during the qubit readout sequence, which comprises performing the sideband cooling while globally illuminating the array of optical traps with an imaging laser, and imaging the qubits using fluorescence induced by the imaging laser.

8. The method of claim 7, wherein performing the qubit readout sequence further comprises selectively and locally illuminating one or more qubits with a qubit addressing laser pulse at the second qubit addressing laser frequency to transfer the one or more qubits to the third internal state |c> prior to imaging the qubits with the imaging laser.

9. The method of claim 1, wherein:

the array of optical traps comprises a trap frequency ω that is essentially the same for all qubits; and performing the local single qubit gate operation comprises illuminating the array of optical traps with a single qubit state transition laser pulse or with two consecutive qubit state transition laser pulses having an effective pulse duration that equals $$\frac{\omega}{\Omega} = 2n + 1, n \in \mathbb{N},$$

where $\Omega$ is a Rabi frequency associated with the qubit state transition laser and qubit ground state |0> to qubit excited state |1> transition.

10. The method of claim 1, wherein:

the neutral atoms comprise bosonic [88]Sr atoms;

the qubit addressing laser has a design wavelength of 689.4 nm, the Rydberg laser has a design wavelength of 318.5 nm, and the qubit state transition laser has a design wavelength of 698.4 nm; and/or the method further comprises:

shifting the laser frequency of the qubit addressing laser to the first qubit addressing laser frequency;

shifting the laser frequency of the qubit addressing laser to the second qubit addressing laser frequency; and shifting the laser frequency of the qubit addressing laser to a third qubit addressing laser frequency.

11. The method of claim 1, further comprising:

performing the single-qubit and two-qubit gate operations multiple times, and periodically driving the qubit addressing laser to generate a first laser pulse train with a constant inter-pulse duration for performing the single-qubit and two-qubit gate operations multiple times; and/or periodically driving the qubit addressing laser to generate a second laser pulse train with a constant inter-pulse duration, and controlling a spacing between the first laser pulse train and the second laser pulse train.

12. The method of claim 11, further comprising synchronizing the periodic driving of the qubit addressing laser with a characteristic frequency of an external noise source affecting qubit gate fidelity.

13. The method of claim 1, further comprising:

obtaining single-qubit and two-qubit gate operation instructions of a quantum computing protocol; and controlling operation of the qubit addressing laser to locally and selectively illuminate a plurality of qubits and a plurality of pairs of qubits to perform the single and two-qubit gate operations according to the obtained qubit gate operation instructions.

14. A neutral atom quantum computing device comprising means for performing the steps of the method according to claim 1.

15. A tangible, non-transitory computer-readable medium containing a computer program comprising instructions for causing a processor to generate control signals to control a neutral atom quantum computing device to perform the steps of the method of claim 1.

16. A method for quantum computing using a plurality of neutral atoms in an array of optical traps, wherein a first internal state of the neutral atoms serves as qubit ground state |o>, and a second internal state serves as qubit excited state |1>, the method comprising:

performing a local single-qubit gate operation on a qubit comprising:

locally and selectively illuminating the qubit prepared in a superposition state |s> of qubit ground state |0> and qubit excited state |1> with a qubit addressing laser at a first qubit addressing laser frequency to cause a differential Stark shift for the qubit ground state |0> and the qubit excited state |1>; and performing a local two-qubit gate operation on a pair of qubits comprising:

locally and selectively illuminating the pair of qubits prepared in the qubit ground state |0> with the qubit addressing laser at a second qubit addressing laser frequency for coupling the pair of qubits to a Rydberg state |r> of the neutral atoms, wherein:

the array of optical traps comprises a trap frequency ω that is essentially the same for all qubits; and performing the local single qubit gate operation comprises illuminating the array of optical traps with a single qubit state transition laser pulse or with two consecutive qubit state transition laser pulses having an effective pulse duration that equals $$\frac{\omega}{\Omega} = 2n + 1, n \in \mathbb{N},$$

where $\Omega$ is a Rabi frequency associated with the qubit state transition laser and qubit ground state |0> to qubit excited state |1> transition.

17. A method for quantum computing using a plurality of neutral atoms in an array of optical traps, wherein a first internal state of the neutral atoms serves as qubit ground state |o>, and a second internal state serves as qubit excited state |1>, the method comprising:

performing a local single-qubit gate operation on a qubit comprising:

locally and selectively illuminating the qubit prepared in a superposition state |s> of qubit ground state |0> and qubit excited state |1> with a qubit addressing laser at a first qubit addressing laser frequency to cause a differential Stark shift for the qubit ground state |0> and the qubit excited state |1>; and performing a local two-qubit gate operation on a pair of qubits comprising:

locally and selectively illuminating the pair of qubits prepared in the qubit ground state |0> with the qubit addressing laser at a second qubit addressing laser frequency for coupling the pair of qubits to a Rydberg state |r> of the neutral atoms, wherein:

the neutral atoms comprise bosonic $^{88}$Sr atoms;

the qubit addressing laser has a design wavelength of 689.4 nm, the Rydberg laser has a design wavelength of 318.5 nm, and the qubit state transition laser has a design wavelength of 698.4 nm; and/or the method further comprises:

shifting the laser frequency of the qubit addressing laser to the first qubit addressing laser frequency;

shifting the laser frequency of the qubit addressing laser to the second qubit addressing laser frequency; and shifting the laser frequency of the qubit addressing laser to a third qubit addressing laser frequency.

18. The method of claim 17, wherein the neutral atoms comprise bosonic $^{88}$Sr atoms.

19. The method of claim 17, wherein the method further comprises:

shifting the laser frequency of the qubit addressing laser to the first qubit addressing laser frequency;

shifting the laser frequency of the qubit addressing laser to the second qubit addressing laser frequency; and shifting the laser frequency of the qubit addressing laser to a third qubit addressing laser frequency.

20. The method of claim 2, wherein the sideband cooling is performed during the qubit initialization sequence, which comprises loading the plurality of neutral atoms into the array of optical traps, and performing the sideband cooling to transfer the neutral atoms into motional ground states of the array of optical traps.

\* \* \* \* \*